(12) United States Patent
Kundermann

(10) Patent No.: US 6,364,781 B2
(45) Date of Patent: *Apr. 2, 2002

(54) INSTALLATION APPARATUS FOR A COUPLING DEVICE HAVING A HOLDER, WHICH IS PROVIDED ON A FLYWHEEL MASS, FOR A DRIVER

(75) Inventor: Wolfgang Kundermann, Schweinfurt (DE)

(73) Assignee: Mannesmann Sachs AG, Schweinfurt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,653

(22) Filed: Aug. 5, 1999

(51) Int. Cl.[7] .................................................. B23P 19/02
(52) U.S. Cl. ........................................ 464/185; 29/235
(58) Field of Search ........................ 403/326, 359.6, 403/375; 464/51, 100, 98, 101, 158, 901, 185; 74/606 R; 60/330; 215/272, 354; 411/354; 29/235, 240, 274

(56) References Cited

U.S. PATENT DOCUMENTS

| | | | |
|---|---|---|---|
| 2,286,865 A | * 6/1942 | Martin | .................. 215/354 X |
| 2,625,415 A | 1/1953 | Smith | |
| 2,935,860 A | * 5/1960 | Miller | ................... 464/158 X |
| 3,487,529 A | * 1/1970 | Serio, Jr. | ..................... 29/235 |
| 4,124,928 A | * 11/1978 | Stark | ........................... 29/235 |
| 4,437,356 A | 3/1984 | Imazaike | |
| 4,502,279 A | * 3/1985 | Fuehrer | .................. 403/315 X |
| 4,997,408 A | 3/1991 | Copeland | |
| 5,234,278 A | * 8/1993 | Hall, III et al. | ........ 403/326 X |
| 5,267,807 A | * 12/1993 | Biedermann et al. | ... 403/326 X |
| 5,342,242 A | * 8/1994 | Ladd et al. | .................... 464/98 |
| 5,531,549 A | 7/1996 | Fossella | |
| 5,678,712 A | 10/1997 | Rios | |
| 5,845,384 A | 12/1998 | Retzbach | |
| 6,058,805 A | * 5/2000 | Merkler | .................... 74/606 R |

FOREIGN PATENT DOCUMENTS

| | | |
|---|---|---|
| DE | 32 22 119 C1 | 10/1983 |
| DE | 41 22 135 A1 | 1/1993 |
| DE | 198 10 297 | 9/1999 |
| EP | 200 529 | 11/1986 |
| EP | 222 946 | 5/1987 |
| EP | 631 062 | 12/1994 |
| EP | 893 177 | 1/1999 |
| EP | 913 602 | 5/1999 |
| GB | 455 359 | 10/1936 |
| GB | 802 777 | 10/1958 |
| GB | 931 329 | 7/1963 |
| GB | 1 367 252 | 9/1974 |
| GB | 1 406 455 | 9/1975 |
| GB | 1 462 525 | 1/1977 |
| GB | 1 522 825 | 8/1978 |

(List continued on next page.)

Primary Examiner—Lynne H. Browne
Assistant Examiner—Greg Binda
(74) Attorney, Agent, or Firm—Cohen, Pontani, Lieberman & Pavane

(57) ABSTRACT

An installation apparatus for a coupling device having a drive, a driver that acts on the drive, a flywheel mass which faces the drive and a holder provided on the flywheel mass so as to face the driver. The installation apparatus includes two ring elements which are fittable so that they can rotate on a component of the coupling device which has a radially inner toothed system. The ring elements have a deformation formation by which, when the ring elements rotate about an axis of rotation, radial positioning of the component which has the toothed system located radially on the inside can be varied in a region of the toothed system located radially on the inside. The ring elements have inclines that run in opposite directions and a pair of the inclines are assigned to each tooth.

4 Claims, 34 Drawing Sheets

FOREIGN PATENT DOCUMENTS

| | | |
|---|---|---|
| GB | 2 126 655 | 3/1984 |
| GB | 2 171 447 | 8/1986 |
| GB | 2 275 318 | 8/1994 |
| GB | 2 298 262 | 8/1996 |
| GB | 2 301 166 | 11/1996 |
| WO | WO 88/01350 | 2/1988 |
| WO | WO 92/12355 | 7/1992 |

\* cited by examiner

INSTALLATION APPARATUS FOR A COUPLING DEVICE HAVING A HOLDER, WHICH IS PROVIDED ON A FLYWHEEL MASS, FOR A DRIVER

BACKGROUND OF THE INVENTION

1. Field of the Invention

The invention relates to a coupling device having a flywheel mass which faces a drive and is connected to a driver.

2. Discussion of the Prior Art

German reference DE 41 22 135 A1 describes, as can be seen by way of example in FIG. 1, a coupling device in the form of a hydrodynamic torque converter, in which a flywheel mass which faces the drive is formed by a radial flange which runs radially outward from a bearing journal which is mounted in the transmission housing via a holder. The radial flange is firmly connected to the pump shell of the pump wheel. On the other hand, together with an output drive shaft, the turbine wheel forms a flywheel mass on the output-drive side.

Returning to the radially inner bearing journal, this is formed with an internal tooth system which engages in an external tooth system on a drive shaft. This drive shaft likewise has an external tooth system at the other end, via which it engages in a corresponding internal tooth system on the crankshaft of an internal combustion engine. This drive shaft is thus used as a driver for the flywheel mass which faces the drive.

Although the drive shaft produces a connection between the drive and the flywheel mass such that they rotate together, it is impossible, due to play in the tooth systems, to avoid rattling or chattering occurring in the region of these tooth systems when torsional oscillations occur.

A further problem with the known coupling device is that neither the mounting for the bearing journal nor the drive shaft ensure that the flywheel mass which faces the drive is secured axially, and thus that the entire torque converter is secured axially on the crankshaft. The torque converter could thus carry out axial movements which would have to be supported in the transmission and could lead to damage there.

In order to avoid the problems mentioned above, it is normal, as can be seen from FIG. 1 in German reference DE 32 22 119 C1, to which U.S. Pat. No. 4,523,916 corresponds for a plate which is elastic in the axial direction to be screwed detachably to the free end of the crankshaft of a drive. The plate, for its part, is screwed in the radially outer region to the flywheel mass, which faces the drive, of the coupling device, in the present case once again formed by a hydrodynamic torque converter. However, the solution is complex since, in order to screw the flexible plate to the flywheel mass, threaded blocks must be attached to the flywheel mass, at specific distances from one another and distributed around the circumference, these blocks being used to hold the screws. Furthermore, due to the confined physical space conditions and difficult access conditions, it is extremely difficult to screw the flexible plate to the corresponding flywheel mass of the coupling device.

SUMMARY OF THE INVENTION

The invention is based on the object of providing a coupling device that can be attached to a drive, with as little installation complexity as possible, and without any play in the circumferential direction.

As a result of the measure of designing the driver (which is attached to the drive, for example to the crank-shaft of an internal combustion engine) with an axial attachment, in the case of which at least one tooth of a tooth system engages in a corresponding tooth system on a holder which is attached to the flywheel mass, a connection is produced between the holder and the driver, and thus between the drive and the flywheel mass, such that they rotate together. Since at least one of the two tooth systems is subject to radial prestressing with respect to the other tooth system in each case, the connection between the driver and the holder essentially has no radial play. If, for example, the at least one tooth which is formed on the axial attachment of the driver is radially prestressed, this tooth is pressed radially as deeply as possible into the tooth system of the holder in order to allow a force-fitting joint to be produced with the tooth system of the holder. This operates particularly well if the tooth flanks of both tooth systems are each designed with a wedge surface so that, for example, in each case one tooth of the tooth system of the driver penetrates radially, like a wedge, between in each case two teeth of the tooth system of the holder, and is firmly clamped at a predetermined penetration depth. Connected to one another in such a way, there is no play between the tooth systems of the driver and holder, so that no chattering can occur even in the event of severe torsional oscillations. Furthermore, the firm clamping (described above) of the teeth of the driver in the tooth system of the holder when torque is being transmitted results in the following advantage: the torque results in a circumferential force acting on the teeth. Since, however, these teeth engage in one another without any play, each tooth is supported in the circumferential direction, so that the tooth base is not loaded with any bending torque. Instead of this, the tooth just needs to be supported against transverse forces, so that the load remains limited. This advantage is particularly important when the teeth of the tooth system of the driver can be supported on the teeth of a holder which is designed, for example as a ring and, in consequence, has a tooth system which is dimensionally stable in the circumferential direction. The advantage becomes particularly major if the annular holder encloses the driver and is provided with an internal tooth system so that the radial prestressing in the tooth system of the driver is supported during rotation by the centrifugal force, while the ring which encloses the tooth base of the tooth system on the holder radially supports the teeth of the tooth system of the driver.

The tooth system of the driver is assigned an axial securing device which is designed, for example, as a claw with a radial holder, in which case the radial holder engages in a radial depression on the holder. In the situation where this radial holder is designed in the form of a wedge, a clamped connection is once again produced with the matching shape of the radial depression in the holder.

As already described, the tooth system of the driver is radially prestressed with respect to the holder. In order to produce an engaged connection between the driver and the holder when the latter is being pushed onto the driver, an installation apparatus is used, which acts on the driver in such a way that its axial attachment is deformed against the influence of the prestressing such that the engaged connection between the driver and the holder is produced essentially without any axial forces. As soon as this connection has been produced, the influence of the installation apparatus is canceled. This can either be done by removing the installation apparatus completely from the driver or else, in the situation where the installation apparatus is left on the driver, it is released, so that it can no longer exert any influence on the tooth system of the driver.

The measure of using the axial attachment of the driver at an axially free end as a bearing surface for the installation apparatus means that, due to the lever effect of this free end with respect to its other end, which is attached to the radial flange of the driver, a relatively small installation force need be applied by the installation apparatus in the radial direction, in which case this installation force may be less than the prestressing force acting in the direction toward the tooth system of the holder. If the ratio of the installation force to the prestressing force is advantageous in a manner such as this, the prestressing force may be chosen to be sufficiently high so that axial movement between the driver and the holder can be constrained just by the friction force within the tooth system. It is thus possible to dispense with an additional axial securing device.

If an axial securing device is attached to the free end of the axial attachment for the connection between the driver and the holder, this axial securing device can engage in the holder in the axial region where the tooth system extends. This results in a very small axial space requirement.

The radial flange of the driver is designed with an axially elastic flange. This axial elasticity can be increased further by designing this last-mentioned flange with an elastic spring turn, thus allowing tumbling movements of the crank-shaft to be better compensated for. Such an elastic spring turn on the flange may act in an even more advantageous manner if it is provided with a damping means which is preferably composed of an elastomer which at least partially fills the radial free space created by the spring turn. Such a damping means makes it possible to damp oscillations which could be triggered by the previously mentioned tumbling movements of the crank-shaft on the spring turns.

In the same way as the driver, the holder can also be designed with an axially elastic flange, by which means additional axial elasticity can be introduced into the connection of the converter housing to the crankshaft, particularly if the axially elastic flange of the holder has an elastic spring turn. Furthermore, if the axial attachment of the holder is designed with a mounting surface for an installation apparatus at its free end, a high radial prestressing force can be achieved between the two tooth systems of the driver and the holder, with acceptable installation forces. As already explained, this makes it possible on the one hand to achieve a chatter-free connection between the two systems while, on the other hand, it is possible to dispense with an additional axial securing device.

In order to achieve the required coupling strength in such coupling devices, the tooth systems which engage in one another and are prestressed with respect to one another must be in contact with one another with relatively high radial prestressing and/or the components used must be correspondingly stiff. However, this means that a relatively large amount of radial force must be exerted on at least one of the tooth systems in order to make or break the coupled state. Based on a further aspect, the present invention thus proposes an installation apparatus which is able to produce the required radial forces in such coupling devices. In particular, an installation apparatus is proposed by means of which an engagement like a tooth system between the tooth systems of two components can be made or broken, with the tooth systems engaging at least radially in one another. The tooth system located radially on the inside being prestressed radially outward with respect to the tooth system located radially on the outside. That component which has the tooth system located radially on the inside is radially elastically deformable at least in the region of its tooth system. The installation apparatus comprises at least one ring element which is fitted or can be fitted to the component which has the tooth system located radially on the inside, such that they can rotate. The at least one ring element has a deformation formation, by means of which, during rotation of the at least one ring element about an axis of rotation, the radial positioning of the component which has the radially inner tooth system can be varied in the region of the radially inner tooth system.

This installation apparatus is preferably designed in such a way that the deformation formation, assigned to each tooth or in each case one group of teeth in the radially inner tooth system, has a deformation incline which extends in the circumferential direction, is directed radially inward and whose distance from the axis of rotation varies in the circumferential direction. Provision of this deformation incline allows a rotary movement to be converted into a radial movement in a simple manner, in which case the conversion ratio and thus the rotation force to be applied can be determined, in particular, by the inclination angle of the deformation incline or of the deformation inclines.

For example, it is possible for a region which is at an approximately constant distance from the axis of rotation to be adjacent to a region whose distance between the deformation incline and the axis of rotation is at a minimum in the circumferential direction, and/or to a region where the distance between the deformation incline and the rotation axis is at a maximum. An approximately constant distance can in this case also load a short region extending essentially tangentially with respect to a radial line.

The installation apparatus according to the invention preferably has two ring elements.

These two ring elements then comprise deformation inclines which each run in opposite directions to one another, in which case each tooth or each group of teeth is assigned a pair formed from a deformation incline on each ring element.

Such an installation apparatus can be used to make or break the coupling engagement in such a manner that the two ring elements can rotate, or can be rotated, in mutually opposite directions about the axis of rotation.

In this case, it is advantageous if the two ring elements are prestressed with respect to one another with regard to rotation in the circumferential direction, preferably to a relative rotation position in which the coupling engagement between the tooth systems is produced.

In order to allow the coupled state to be made or broken by means of the installation apparatus according to the invention, the at least one ring element has a tool attachment formation for a tool to act on, by means of which tool the at least one ring element can be rotated about the axis of rotation.

Since the design of the installation apparatus according to the invention is very simple, that is to say its design is very economical and its total weight is low, the at least one ring element is held such that it can rotate on that component which has the tooth system located radially on the inside. This means that the at least one ring element remains permanently on this specific component, even when the coupled state is produced.

The present invention furthermore relates to a coupling device for producing a rotating coupling between two assemblies which can rotate about an axis of rotation, in which case the coupling device comprises, assigned to one of the assemblies, a first component having a first tooth system and, assigned to the other of the assemblies, a second component having a second tooth system, in which case the two tooth systems engage radially in one another and are prestressed radially in engagement. Such a coupling device can preferably be provided with an installation apparatus according to the invention.

As already mentioned above, the various components which can be used for coupling in such coupling devices have to satisfy two contradictory requirements. On the one hand, they must have sufficient radial elasticity to allow the coupled state between the two tooth systems to be made or broken by means of installation apparatuses. On the other hand, when in the coupled state, that is to say when the two tooth systems have been engaged with one another, the prestressing force must be sufficiently strong so that the coupled state is maintained and the two tooth systems are prestressed with respect to one another, with the tooth systems engaged, in a suitable manner. It order to satisfy this requirement, a further aspect of the present invention envisages a tooth system component, in particular as a driver or holder for a coupling device according to the invention. The tooth system component has a central body region from which a plurality of elastic tonguelike projections project radially outward, in which case at least one tooth of the tooth system is provided in a radially outer region of each projection.

In the case of such a refinement, the fitting of teeth or groups of teeth to respective tongue-like projections first of all ensures that the coupled engagement can be broken and remade easily using various installation tools, due to the elasticity of the tongue-like projections. Furthermore, however, due to the possibility of choosing suitable resilient materials, for example spring steel, as the construction material, the various tongue-like projections provide an adequate prestressing force, by means of which the tooth systems, once they have been engaged with one another, can be kept engaged.

For example, it is possible for the radial projections to have a width in the circumferential direction which decreases radially outward, starting from the body region.

In this case, the ratio A/I of the width in the radially outer region to the width in the radially inner region can advantageously be in the range $0.5 \leq A/I \leq 1.2$, preferably being about 0.8.

In order to obtain the required radial elasticity while the strength is still adequate to transmit the torques which occur, it is advantageous for an essentially curved transition to be formed between two adjacent radial projections on the central body region. In this case, it has been found to be advantageous for the curved transition to have a radius of curvature which is greater than or equal to the material thickness of the tooth system component in the region of the radial projections.

In order to obtain the required radial elasticity on the one hand, and the required radial prestressing force on the other hand, it is furthermore advantageous if the ratio B/M of the width in the circumferential direction to the material thickness in each case in the region of the radial projections is in the range $5 \leq B/M \leq 30$, preferably about 10.

In a particularly preferred refinement of the tooth system component according to the invention, in which the contradictory requirements mentioned above can be satisfied in an excellent manner, the invention provides that, originating from the central a body region, the radial projections are initially preferably bent approximately in the axial direction in a first bend region, are then bent essentially radially outward in a second bend region, and are then bent essentially in the axial direction in a third bend region, and have at least one tooth of the tooth system in this region, which extends approximately axially, that is to say, for example, at an angle in the range from 0° to 5° with respect to the axis of rotation. With such an arrangement, the radial elasticity is provided by inward radial springing, in which case it is possible to ensure, due to the resultant S-shape or swan's-neck shape, that during this inward springing movement, in particular the radially outer regions which are fitted with the teeth and extend essentially axially are moved radially and are essentially not pivoted, so that uniform engagement or disengagement with the complementary tooth system is achieved over the entire axial tooth length, and essentially radially directed prestressing is likewise achieved essentially without any tilting movement.

In this case, it is advantageous for the radius of curvature in the second and/or third bend region to be greater than or equal to 1.5 times the material thickness in the region of the radial projections.

It is furthermore possible for the second and the third bend region together to form an essentially continuous bend region, which is approximately semicircular.

If, as has been described above, the radial projections are essentially bent in an S-shape or swan's-neck shape, and the prestressing and the radial inward movement are thus essentially achieved by bending deformation in the various bend regions, it is advantageous if the radial projections are essentially not curved in the circumferential direction in their region which extends essentially in the axial direction and has at least one tooth. Such curvature in the transitional region to the third bend region would result in a three-dimensionally curved surface being formed, with corresponding stiffness, which could have a disadvantageous effect on the spring response.

In this case, it is furthermore preferred for the radial projections not to be significantly curved in the circumferential direction in the region of the third bend region which is adjacent to the region which essentially extends in the axial direction. This configuration, which is essentially planar when considered in the circumferential direction, also contributes to increased spring elasticity in this region.

The spring response of the tooth system component according to the invention can furthermore be influenced in an advantageous manner by at least one of the radial projections having at least one slot which preferably extends essentially radially.

This slot can, for example, be designed in such a manner that, starting from the body region, it extends at least as far as the second bend region.

According to a further advantageous aspect of the present invention, it is possible in the case of a tooth system component to provide for the teeth on the tooth system component each to have tooth flanks pointing essentially in the circumferential direction, and for the tooth flanks to be inclined, with respect to a longitudinal center plane of the respectively associated tooth, at an angle in the range 10° to 50°, preferably 20° to 30°. Such a configuration leads to the advantage that, on the one hand, as a result of the oblique position of the tooth flanks, the radially acting force component which occurs when a torque is introduced is not yet sufficiently large to cause the tooth systems to disengage inadvertently. On the other hand, such an inclined position of the tooth flanks has the advantage that it is easily possible to compensate for minor manufacturing tolerances which could lead to undesirable movement play if the inclined position of the tooth flanks were considerably less.

The present invention furthermore relates to a coupling device which has a tooth system component according to the invention as a driver and/or as a holder.

In order to be able to provide the requirements with regard to elasticity and spring force for a tooth system component for a coupling device according to the invention, a further aspect of the present invention proposes that the tooth system component has a plurality of teeth which follow one another in the circumferential direction. Each tooth is formed on a tongue-like projection and has an end surface which points essentially in a radial direction as well as flank surfaces which merge into the end surface and point essentially in a circumferential direction. In this case, the tooth system component is then formed from a steel sheet, preferably spring steel sheet, and the tongue-like projections have at least one axially or approximately axially extending region, on which the respectively associated tooth is formed.

By using steel material, for example spring steel material, it is possible in conjunction with the forming to achieve a design in which the spring effect that is produced on the one hand allows the movement to allow the installation apparatus to release the coupling engagement while, on the other hand, an adequate prestressing force is maintained once the coupling engagement has been produced.

In order to form the teeth with an end surface and flank surfaces on such a tooth system component, it is proposed that each approximately axially extending region is formed with circumferential projections on its circumferential end regions, which circumferential projections are bent in the radial direction in order to provide the flank surfaces.

If, for example, the tooth system is a tooth system which is open radially outward and is designed to hold a complementary tooth system which is open radially inward, then the circumferential projections are preferably bent radially inward. This means that, in this case, the outer surface of the approximately axially extending region forms the end surface, from which each of the flank surfaces project radially inward.

In an alternative embodiment, it is possible to provide for side surfaces (which point essentially in the circumferential direction) of the approximately axially extending regions to each form a flank surface. Thus, in this embodiment, the entire wall or material thickness of each approximately axially extending region intrinsically forms a tooth, in which case the respective side surfaces provide the flank surfaces.

In a further alternative embodiment, it is possible to provide for the tooth to be formed on each approximately axially extending region by stamping, forming or the like.

In order to compensate for production tolerances, it is proposed that the flank surfaces are at an inclination angle in the range from 10° to 50°, preferably 20° to 30°, with respect to the longitudinal center plane of the respectively associated tooth.

For example, the circumferential projections can be correspondingly bent from the approximately axially extending region in order to form this inclination angle.

In the embodiment in which the material thickness of the essentially axially extending region forms the teeth, it is possible for the side surfaces which point essentially in the circumferential direction to be formed with the inclination angle during production or after processing of the tooth system component.

The present invention furthermore relates to a method for producing a tooth system component, such as that described above, for example. This method comprises the following steps:

a) stamping, cutting or the like, a component blank from a spring steel sheet, b) forming the component blank in order to form the axially or approximately axially extending regions, and c) before and after step b), processing the blank in order to produce a tooth for each axially or approximately axially extending region.

In such a method, step c) may comprise the following procedures:

each tooth is formed by bending circumferential projections around in order to provide flank surfaces and an end surface of the respective tooth, or each tooth is produced by chamfering, broaching or the like from side surface regions of at least each approximately axially extending region, in order to form flank surfaces and an end surface, or each tooth is produced by stamping, forming or the like of the component blank in the region in which the approximately axially extending region is to be formed or is formed.

In the case of the method according to the invention, the tooth system component is preferably shape-hardened once the forming operation has been carried out.

An essential characteristic of a coupling device according to the invention or of a tooth system component for such a coupling device is that it must be possible to deform the tooth system component in order to make and break the coupling engagement. According to a further independent aspect of the present invention, a tooth system component is thus proposed, comprising a plurality of teeth which follow one another in the circumferential direction, in which case each tooth is formed on a tongue-like projection and has an end surface which points essentially in the radial direction as well as flank surfaces which merge into the end surface and point essentially in the circumferential direction. This tooth system component is then preferably designed in such a manner that it can be deformed elastically at least in the region of the tongue-like projections, and is preferably formed from fiber composite material, spring steel sheet, steel sheet or the like. The tongue-like projections have at least one axially or approximately axially extending region, on which the associated tooth is formed. Such a tooth system component can thus, on the one hand, be elastically deformed in order to make and break the coupling engagement. Furthermore, this makes it possible to allow tumbling movement during operation between the input side and the output side of such a coupling device, that is to say between a drive shaft and a converter housing or a coupling or the like, within the elastic range of this tooth system component. A wide range of materials which allow this elasticity can then be used to construct such a tooth system component. For example, steel sheet or sheet metal may be used. It is also possible to use fiber composite materials, such as carbon-fiber materials, which provides the required elasticity on the basis of specific shaping or material thickness.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
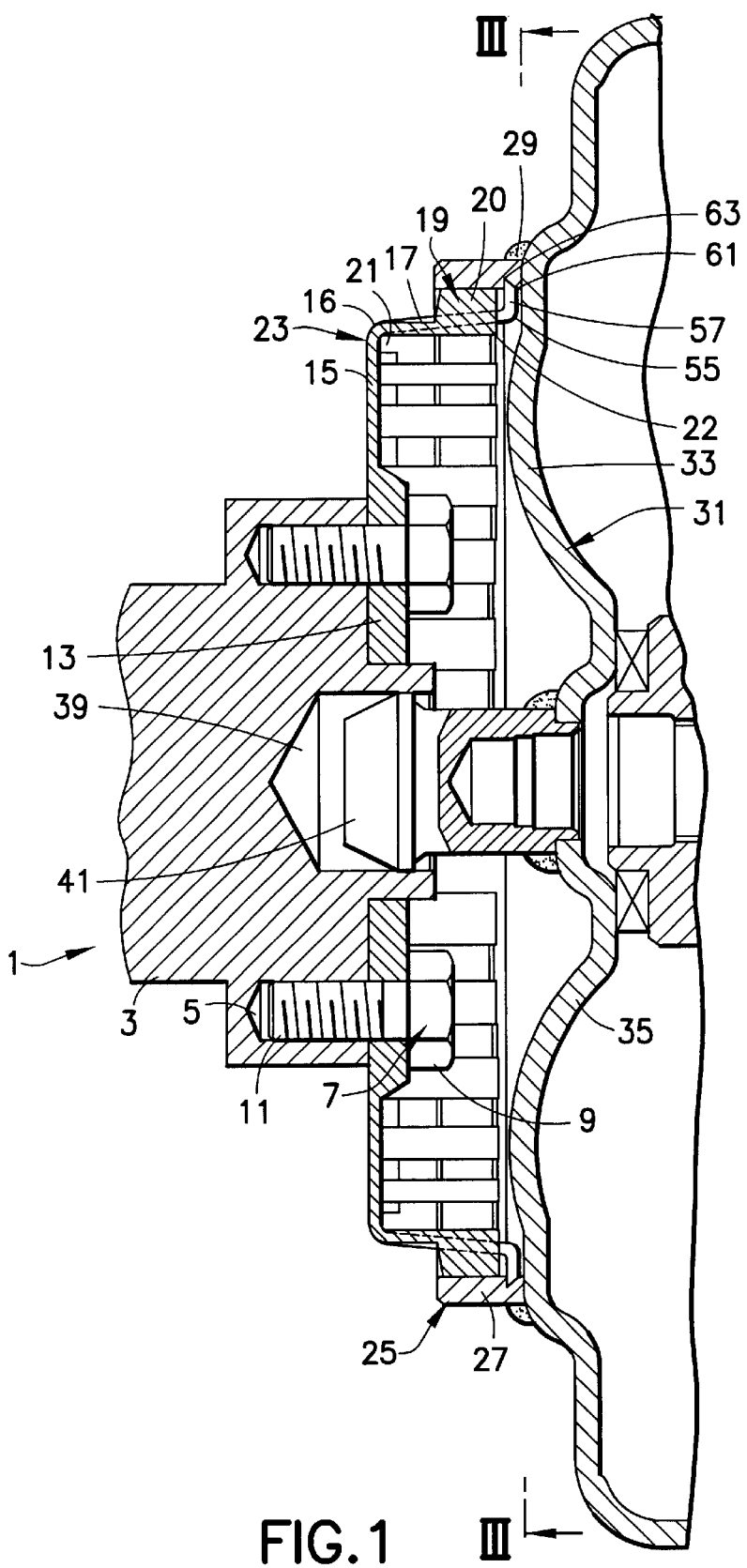
FIG. 1 shows a section of a drive having a driver, inserted in a holder of a coupling device.

FIG. 1 shows the free end of the crankshaft 3 of an internal combustion engine, which acts as a drive 1. The crankshaft 3 has a plurality of threaded holes 5 distributed around the circumference, into each of which an attachment means 7 in the form of a screw 9 engages by means of a threaded shank 11 on the screw 9. This attachment means 7 attaches a radial flange 13 to the crankshaft 3, which radial flange 13 has a reduced cross section in the radial region outside the attachment means 7 and thus produces a flange 15 which is axially elastic. The flange 15 merges by means of a bend 16 into an axial attachment 17 which, at its free end 22 facing away from the crankshaft 3, has a tooth system 19 with teeth 20 which extend essentially in the axial direction. These teeth 20 merge axially, before reaching the bend 16, into a tooth base 21 formed on the circumference. The radial flange 13 and the axially elastic flange 15 together with the axial attachment 17 form a driver 23, which engages with a holder 25 in a manner which will be described in more detail later. The holder 25 is designed as a ring 27 and is attached by means of a weld bead 29 to a flywheel mass 31, which has a primary flange 33. In the present exemplary embodiment, the primary flange 33 is part of a housing 35 of a hydrodynamic torque converter, as a coupling device, but is likewise conceivable as a flywheel mass on the drive side of a two-mass flywheel as is evident, for example, from German reference DE 44 22 732 A1. In order to accommodate the housing 35 of the hydrodynamic torque converter, the crankshaft 3 has an axial hole 39 at its center of rotation, in order to accommodate a bearing journal 41 which is attached to the primary flange 33 radially on the inside.

Figure 2:
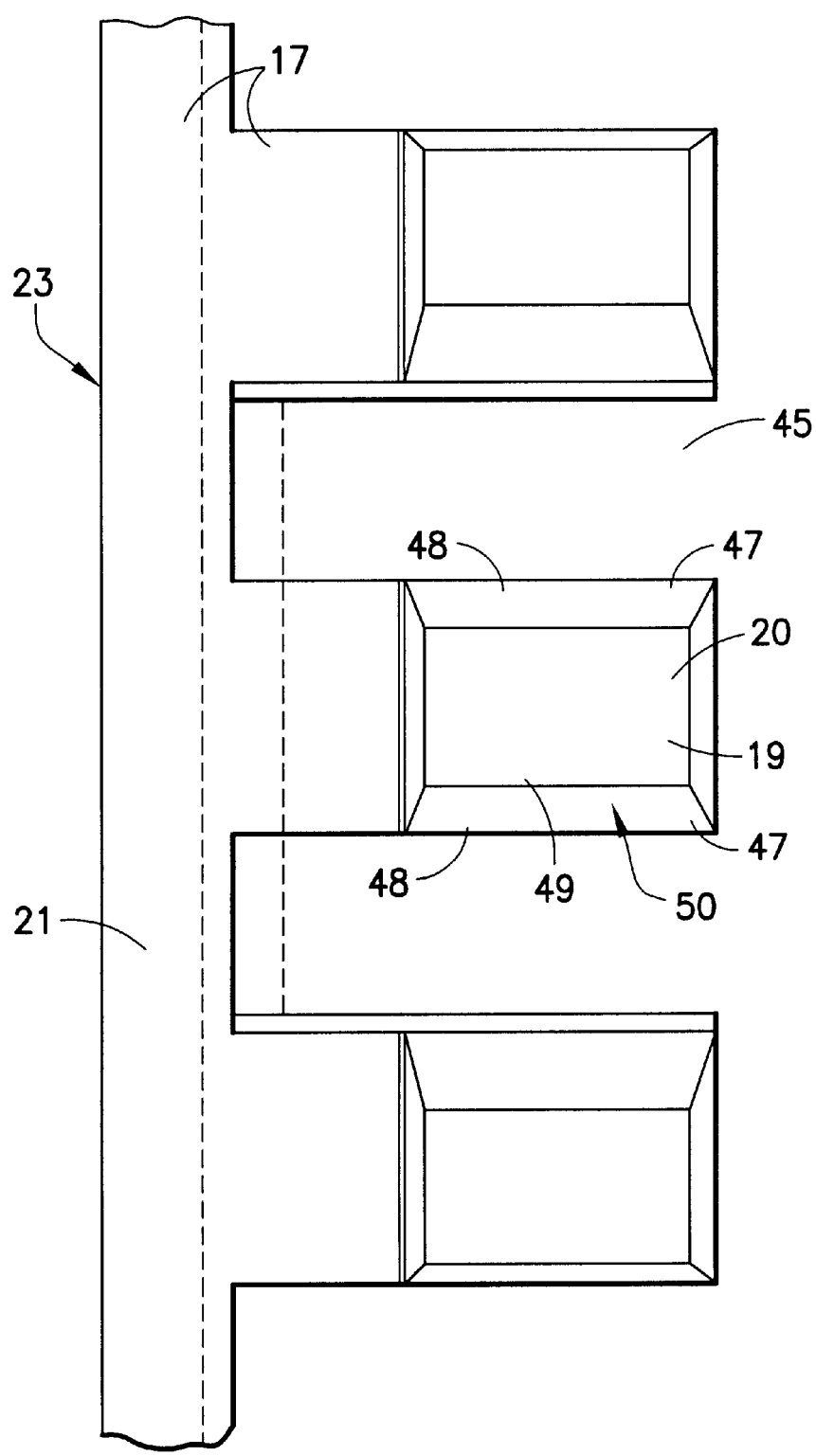
FIG. 2 shows a detail of a tooth system part of the driver.
Figure 3:
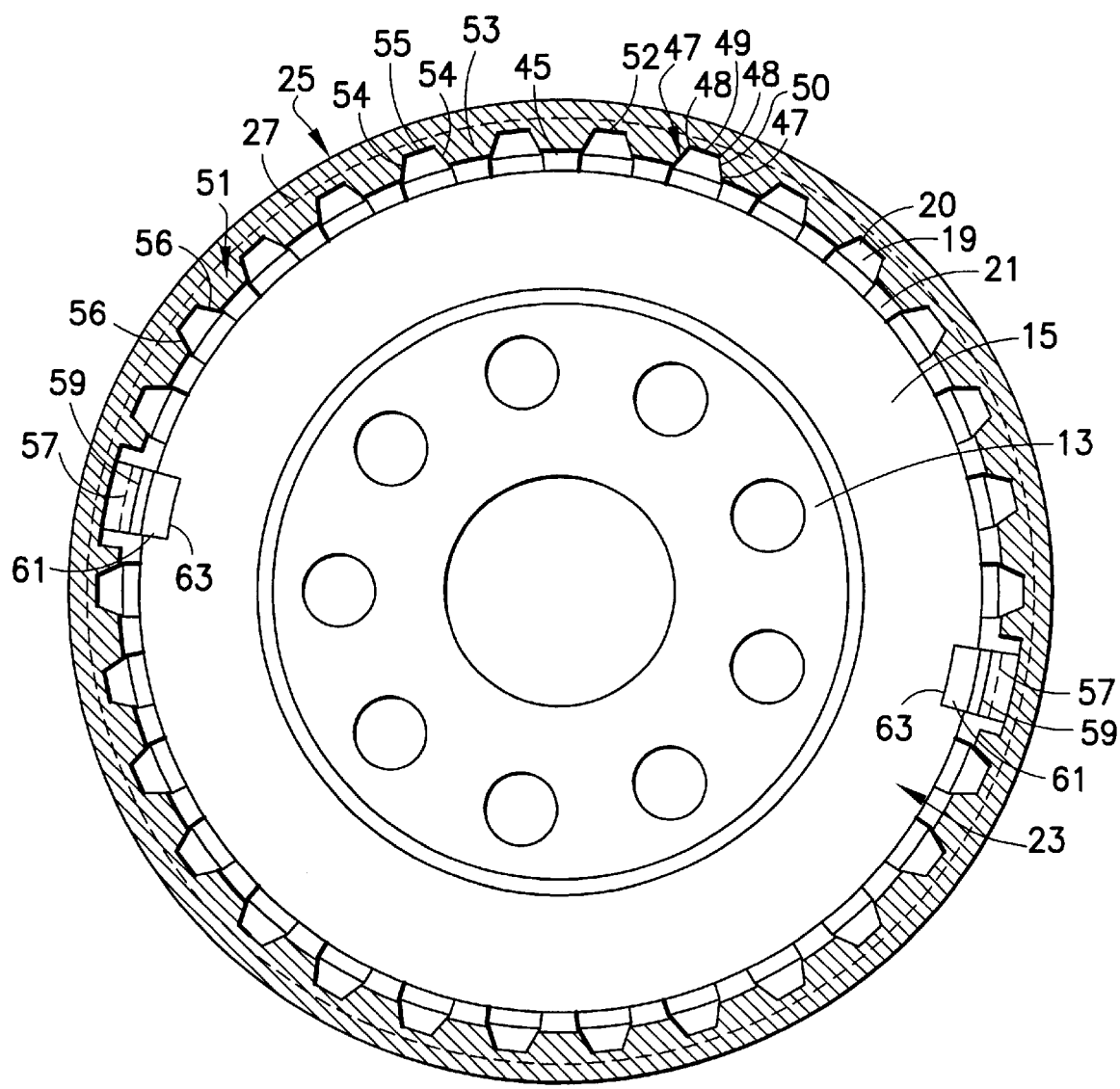
FIG. 3 shows a plan view of the driver along the section line III—III in FIG. 1, but without fastening screws.

Returning to the driver 23, as can be seen better in FIGS. 2 and 3, this has a tooth gap 45 in each case between each two teeth 20 in the region in which its tooth system 19 extends, in each of which tooth gaps 45 one tooth 53 of the tooth system 51 on the holder 25 engages. Conversely, the holder 25, for its part, has a tooth gap 52 between each two teeth 53 of its tooth system 51, for in each case one tooth 20 of the tooth system 19 on the driver 23. The design of a tooth 20 of the tooth system 19 can in this case be seen particularly in FIG. 2. On the circumferential side, the tooth 20 has tooth flanks 47 which run at an angle other than a right angle with respect to the radial axis of the tooth 20, and thus form a wedge surface 48. In the radial direction, the tooth 20 is bounded by a tooth tip 49. Due to its design, the tooth 20 acts as a wedge 50 which, as shown in FIG. 3, engages in the correspondingly designed tooth gap 52 between two teeth 53 on the holder 25. Measured on their radial axis, the teeth 53 on the holder 25 are likewise designed at an angle other than a right angle, so that wedge surfaces 54 are produced on each side of each tooth 53, and their inclination is preferably matched to the wedge surfaces 48 of the teeth 20. With appropriate radial prestressing of the teeth 20 on the driver 23 in the direction of the tooth base 55 on the holder 25, the tooth 20 can accordingly be firmly clamped in the tooth gap 52, before it reaches this tooth base 55.

As already mentioned above, the teeth 20 of the tooth system 19 on the driver 23 are prestressed radially outward. To make it easier to mount the coupling device on the crankshaft 3, an installation apparatus 70 (FIGS. 4 to 10), which is described in more detail below, is placed on the axial attachment 17 in the region between the bend 16 and the tooth system 19, and presses all the teeth 20 of the driver 23 radially inward. Held in such a way, the holder 25 can be pushed onto the tooth system 19 of the driver 23 without any axial force. As soon as the axial limit position between the driver 23 and the holder 25 is reached, the installation apparatus 70 is loosened and thus releases the teeth 20, at which point they spring into the tooth system 51 of the holder 25 owing to their radial prestressing, until the clamped connection (which has already been mentioned) is produced in the region of the wedge surfaces 48, 54 of the teeth 20, 53. This ensures that the coupling device is connected without any play in the circumferential direction, that is to say that the converter housing 35 is connected to the crankshaft 3.

In order that the converter housing 35 remains in this axial position, the driver 23 is designed, with respect to the circumference, with two claws 59 which are offset through 1800 and are provided at the appropriate points instead of a tooth 20, and are likewise subject to radial prestressing. At their free end facing the converter housing 35, these claws 59 have a radial holder 61 which extends in the direction of the holder 25 and can engage in a corresponding radial depression 63 in the ring 27 of the holder 25. This engagement process preferably takes place when the installation apparatus 70 (which has already been mentioned above) is loosened and the claws 59 spring radially outward. The radial holder 61 is in this case preferably designed in the form of a wedge, and thus penetrates into a radial depression 63 formed in the same way. The penetration process ends as soon as the claw 59 is held in a clamped manner in the radial depression 63. As soon as this is the case, the converter housing 35 can no longer become detached from the driver 23. The claws 59 accordingly act as an axial securing device 57.

FIGS. 4 to 8 once again show a sectional view which is comparable to FIG. 1 and in which, for reasons of simplicity, the tooth system 19 which is shown correctly in FIG. 1 has been omitted, with the exception of the intersection regions of the tooth system 19. The reason for this is that FIGS. 4–8 serve only to illustrate the already mentioned installation apparatus 70, for which reason as well, essentially only this element is illustrated, with reference symbols in the corresponding figures.

Figure 4:
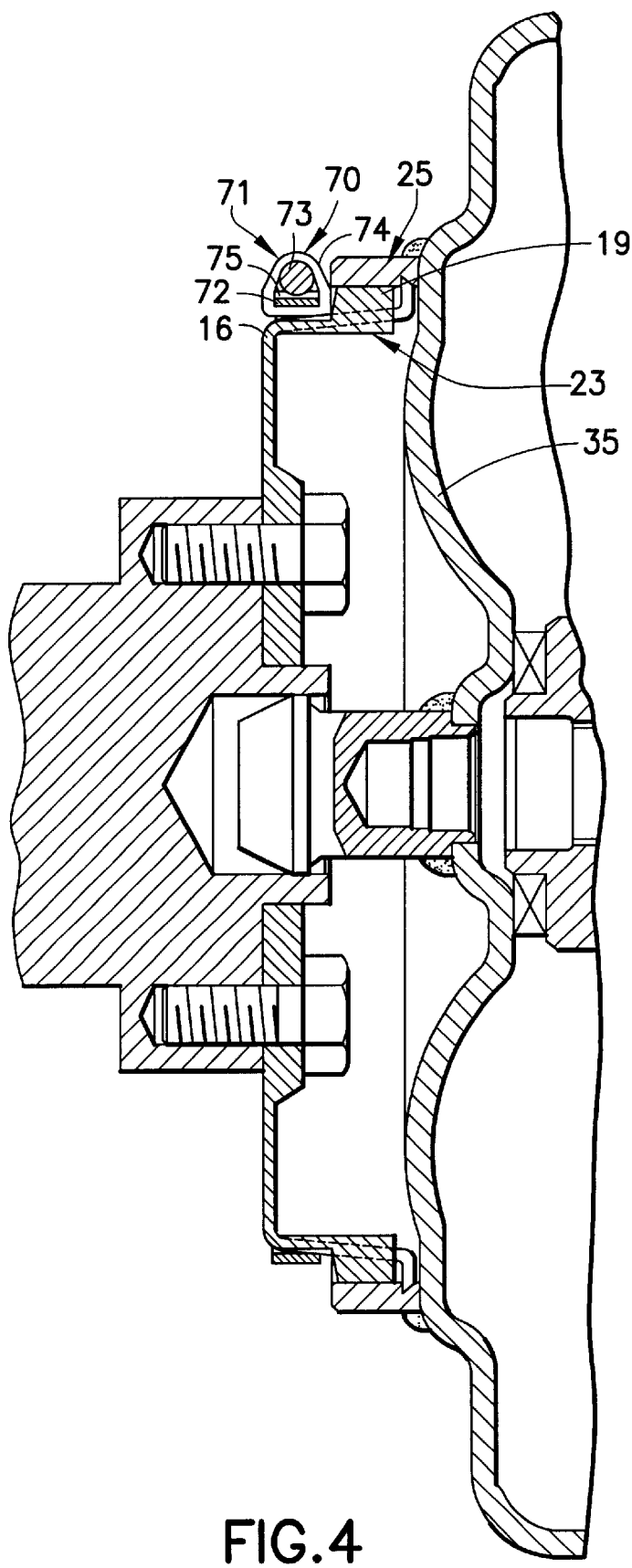
FIG. 4 shows an installation apparatus for connecting the holder to the driver, in the form of a tightening clamp.

The installation apparatus 70 shown in FIG. 4 is formed by a tightening clamp 71, which is essentially arranged axially between the bend 16 and the tooth system 19 of the driver 23, on its axial attachment 17, and is fitted at one end of a strip 72 with a screw housing 74 which is used to hold a tightening screw 73. The screw thread of this tightening screw 73 engages in a thread indentation which is formed at the free end 75 of the strip 72, so that, if the tightening screw 73 rotates, a tightening force is exerted in the circumferential direction on the free end 75 of the strip 72 and, in consequence, the tightening clamp 71 is narrowed or widened—depending on the direction in which the tightening screw 73 rotates. If the rotation direction is chosen to narrow the clamp 71, then, as can be seen in the upper half of FIG. 4, the free end 75 of the strip 72 moves further over the remaining part of the strip 72. As a result of the narrowing of the tightening clamp 71 caused by this, a radial force is transmitted radially from the outside to the axial attachment 17, as a result of which the tooth system 19 is pushed radially inward. As soon as this has been done, this completes the preparation for pushing the holder 25 onto the driver 23 without any axial force. Once this pushing-on movement has ended, the tightening screw 73 is turned in the opposite direction, thus reducing the amount of overlap between the free end 75 and the rest of the strip 72, and thus widening the tightening clamp 71. The tightening clamp 71 can be then completely released from the driver 23, or remain on it without any effect.

Figure 5:
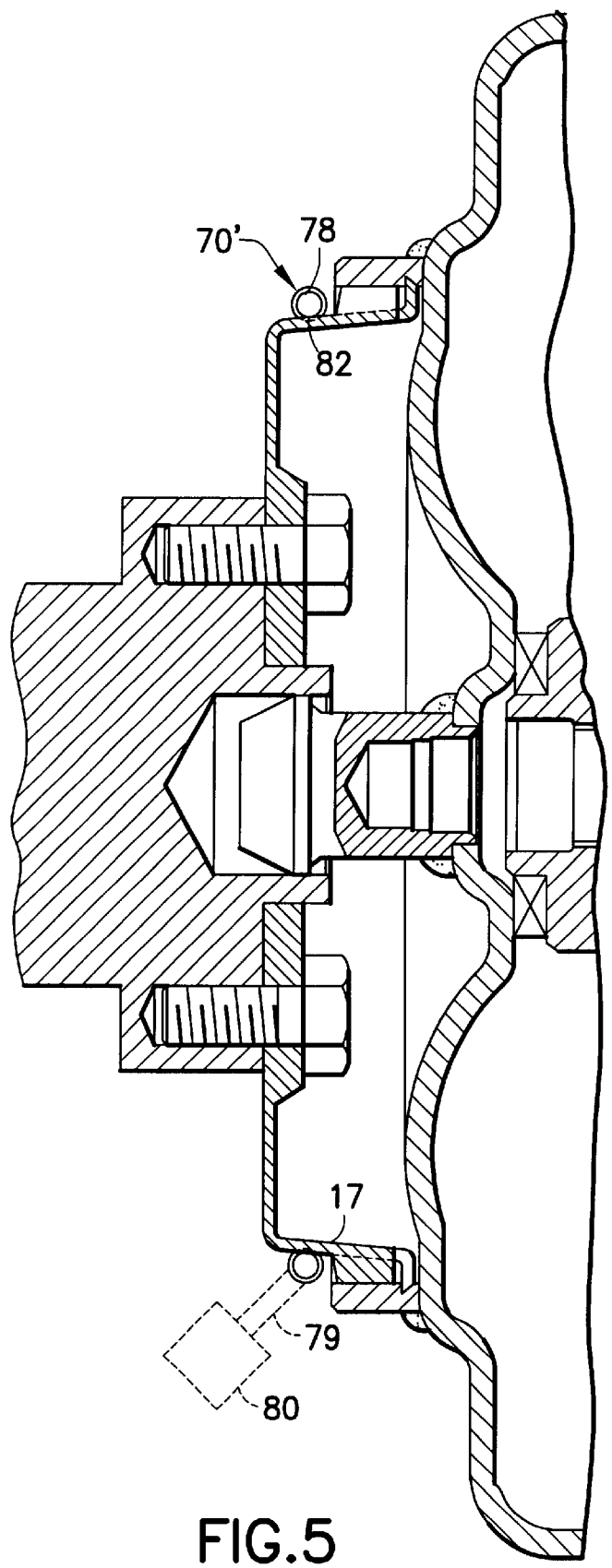
FIG. 5 is as FIG. 4, but with a pressure hose.

In FIG. 5, the installation apparatus 70' is formed by a compression hose 78, which encloses the axial attachment 17. In FIG. 5, this compression hose 78 is unpressurized and thus has a flattened region 82 on its radial inner side facing the axial attachment 17. The compression hose 78 can be connected via a pressure connection 79 to a pressure source 80 which is shown only schematically and, as soon as the pressure source 80 applies an increased pressure to it, the hose cross section expands and, in consequence, pushes the axial attachment 17 radially inward, while the area of the flattened region 82 is at the same time reduced. The axial attachment 17 is thus changed to the shape required for the installation process. The effect of the pressure source 80 just has to be canceled in order to cancel the effect of the installation apparatus 70'. In this embodiment as well, the compression hose 78 can be removed from the driver 23, or may be left on it, without any effect.

Figure 6:
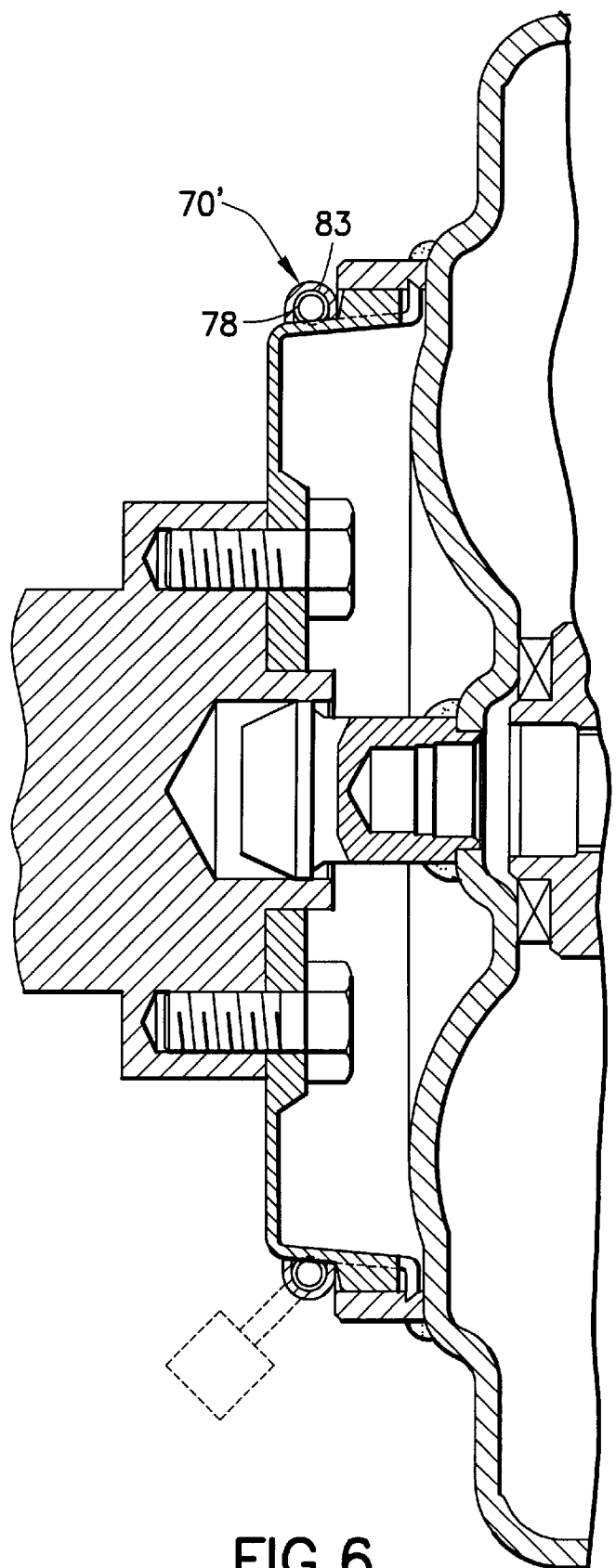
FIG. 6 is as FIG. 5, but with a protective sleeve for the pressure hose.

FIG. 6 shows a modification of the embodiments shown in FIG. 5, the only difference being that the compression hose 78 is enclosed by a protection sleeve 83.

Figure 7:
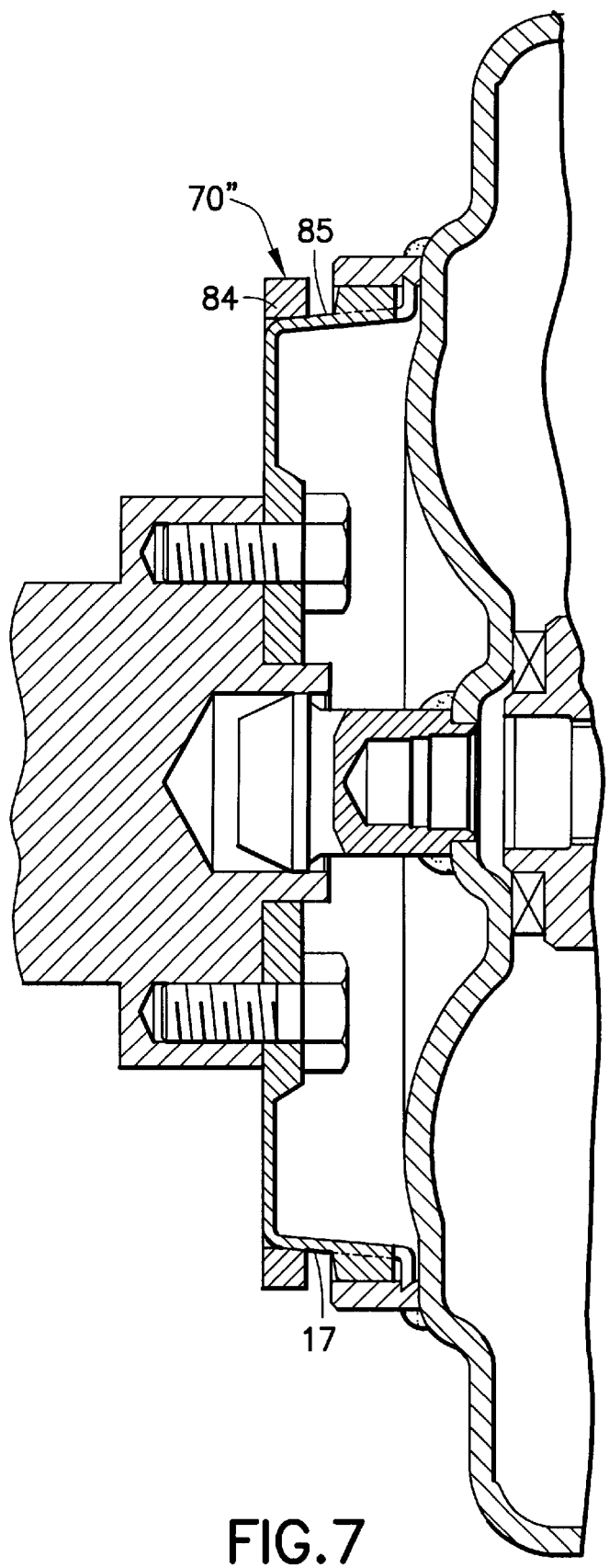
FIG. 7 is as FIG. 4 but with a tightening ring.

FIG. 7 shows a tightening ring 84 as the installation apparatus 70'', in which case the tightening ring 84 is arranged such that it can move on a conical section 85 of the axial attachment 17. If the tightening ring 84 is moved to the right, as shown in FIG. 7, that is to say in the direction of the widened region of the axial attachment 17, it compresses the axial attachment 17 to the size of the internal diameter of the tightening ring 84. Conversely, movement of the tightening ring 84 in the opposite direction, results in the axial attachment 17 springing radially outward.

Figure 8:
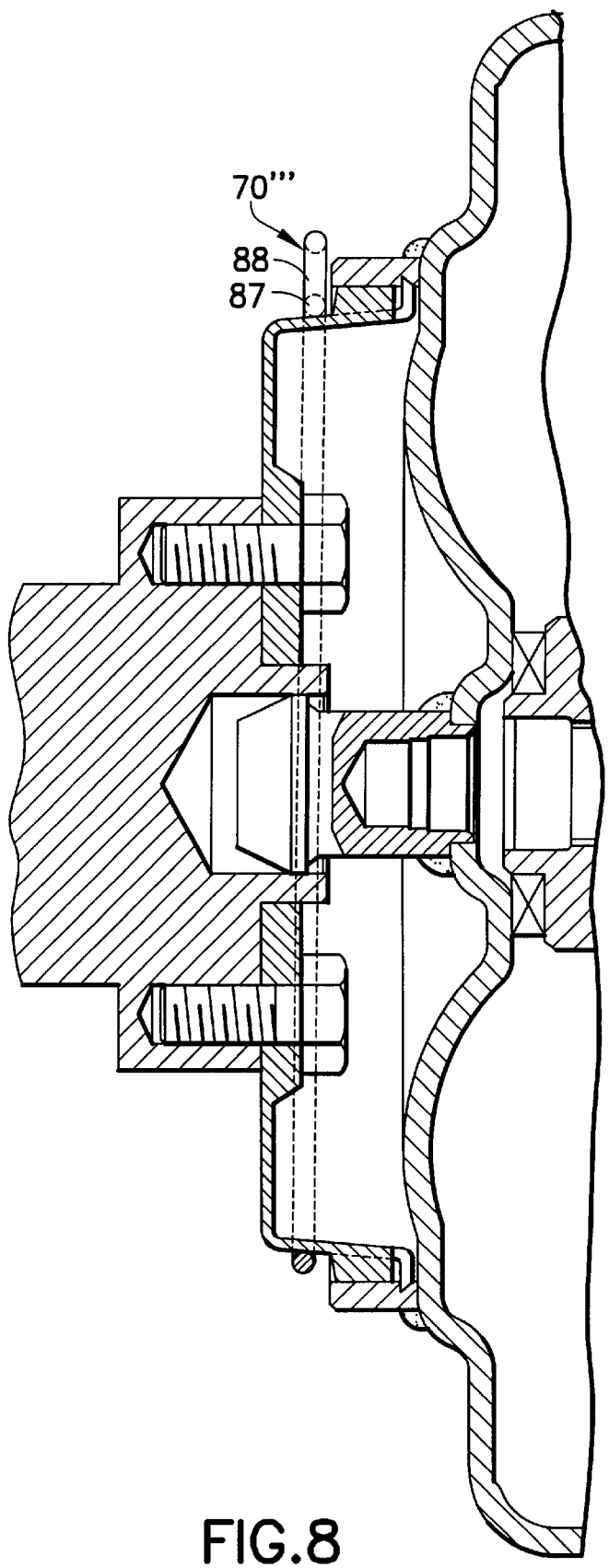
FIG. 8 is as FIG. 4, but with a tightening loop.
Figure 9:
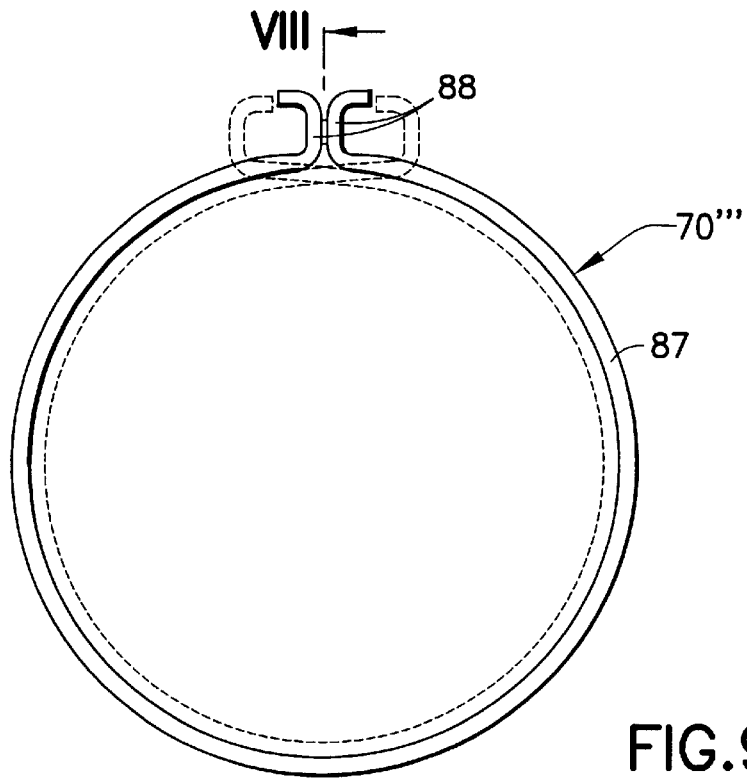
FIG. 9 shows the tightening loop from FIG. 8 as a detail.

FIG. 8 shows an embodiment of the installation apparatus 70''' with a tightening loop 87, which can be seen more clearly in FIG. 9. This tightening loop 87 has spread ends 88 which are prestressed so that they try to move toward one another. The tightening loop 87 then assumes its diameter illustrated by the solid lines. Once a tool (which is not shown) has been fitted to the spread ends 88, they can be pulled past one another in the circumferential direction, until they have reached the position shown by dashed lines. The diameter of the tightening loop is then reduced, and the axial attachment 17 is pushed radially inward. To cancel the effect of this tightening loop 87, the tool which is not shown just has to be removed from the spread ends 88. They spring back to their original position, and thus relieve the load on the axial attachment 17.

Figure 10:
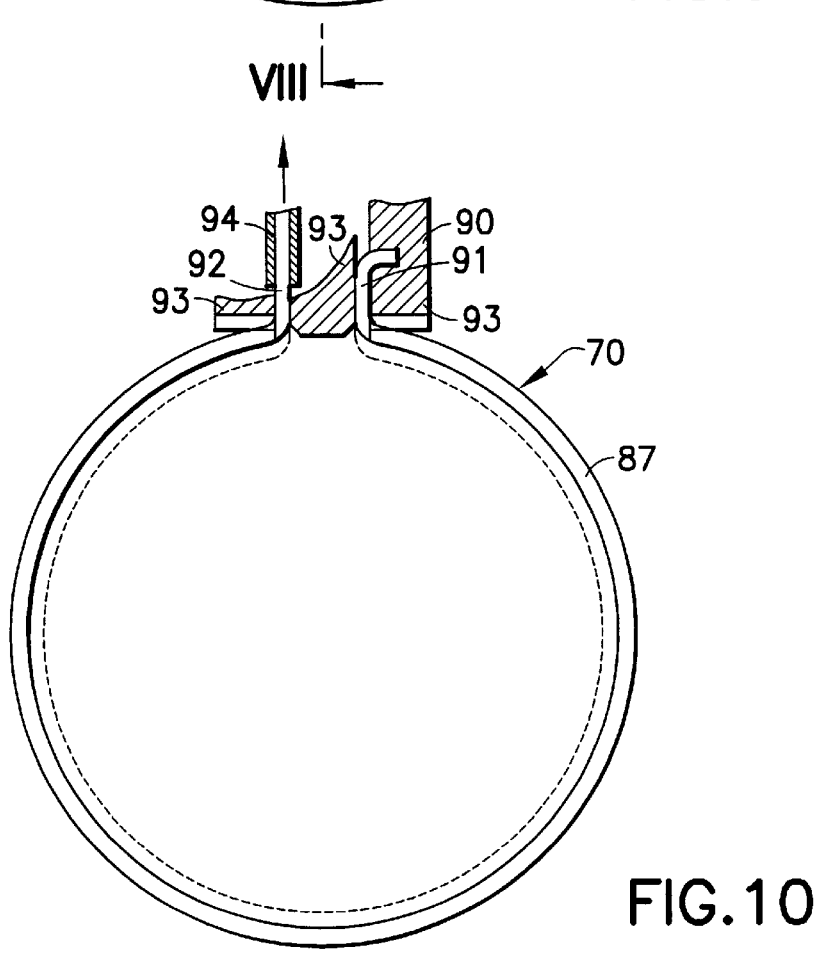
FIG. 10 is as FIG. 9, but in another configuration.

FIG. 10 shows another way of operating the tightening loop 87. In this case, a tool 90 is fitted to the axial attachment 17 radially from the outside. This tool 90 has dies 93 which hold the loop 87, in the region of a holding end 91 as well as a tightening end 92, in radial contact with the axial attachment 17. The holding end 91 is in this case inserted into one of the dies 93, namely into the one on the right in FIG. 10, and is fixed there, while the tightening end 92 is held in a tightening means 94. This tightening means 94 may be, for example, a clamp. As soon as this tightening means 94 is moved in the direction of the arrow shown in FIG. 10, the loop 87 which is secured at the holding end 91 is narrowed from the position shown by solid lines to the position shown by dashed lines, and thus exerts a constricting radial force on the axial attachment 17. Conversely, the tightening means 94 is moved in the opposite direction to relieve the load on the loop 87.

In the following discussion, reference to the installation apparatus 70 is understood to refer equally to the installation apparatuses 70'–70'''.

Figure 11:
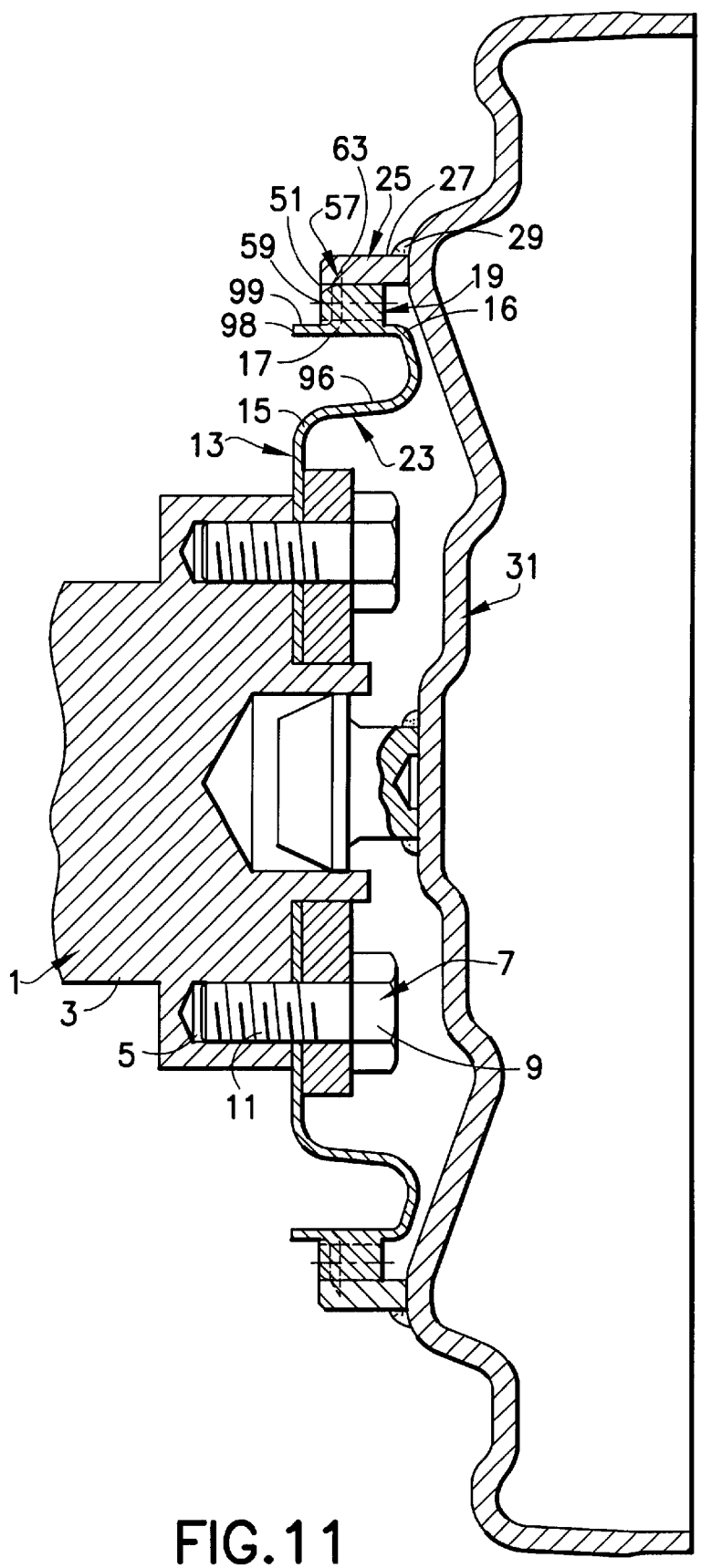
FIG. 11 is as FIG. 1, but with the driver having a different physical design.

In FIG. 11, attention should be directed mainly at the change to the design of the radial flange 13, which represents the major difference from the embodiment shown in FIG. 1, which has already been described. In this case, the axially elastic flange 15 is formed with a spring turn 96 radially outside its diameter that is used for attachment to the crankshaft 3, and this spring turn 96 has a cross section roughly in the shape of a back-to-front letter "C". The radially outer limb of this spring turn 96 is comparable to the already described axial attachment 17 shown in FIG. 1, and is fitted with the tooth system 19 in the axially central region of its external circumference. In the direction of the crankshaft 3, the tooth system 19 is adjacent to an axially free end 98, which has on its external circumference a bearing surface 99 for an installation apparatus 70, as is illustrated for example in FIGS. 4 to 10. An axial securing device 57 is also attached to this free end 98 and has a claw 59 which engages (in a manner which is already known) in a radial depression 63 in the holder 25. Since this claw 59 is attached to the free end 98 of the axial attachment 17, it engages (in the region of the axial extent of the tooth system 51 on the holder 25) in the corresponding radial depression 63, so that the physical space which is available axially is fully utilized. Furthermore, the lever effect of the free end 98 with respect to the bend 16 in the axially elastic flange 15 results in a relatively low installation force being required (exerted by the said installation apparatus 70) in order to overcome a comparatively high radial prestressing force, which can preferably be produced on the driver 23 by virtue of the physical design of the spring turn 96.

Figure 12:
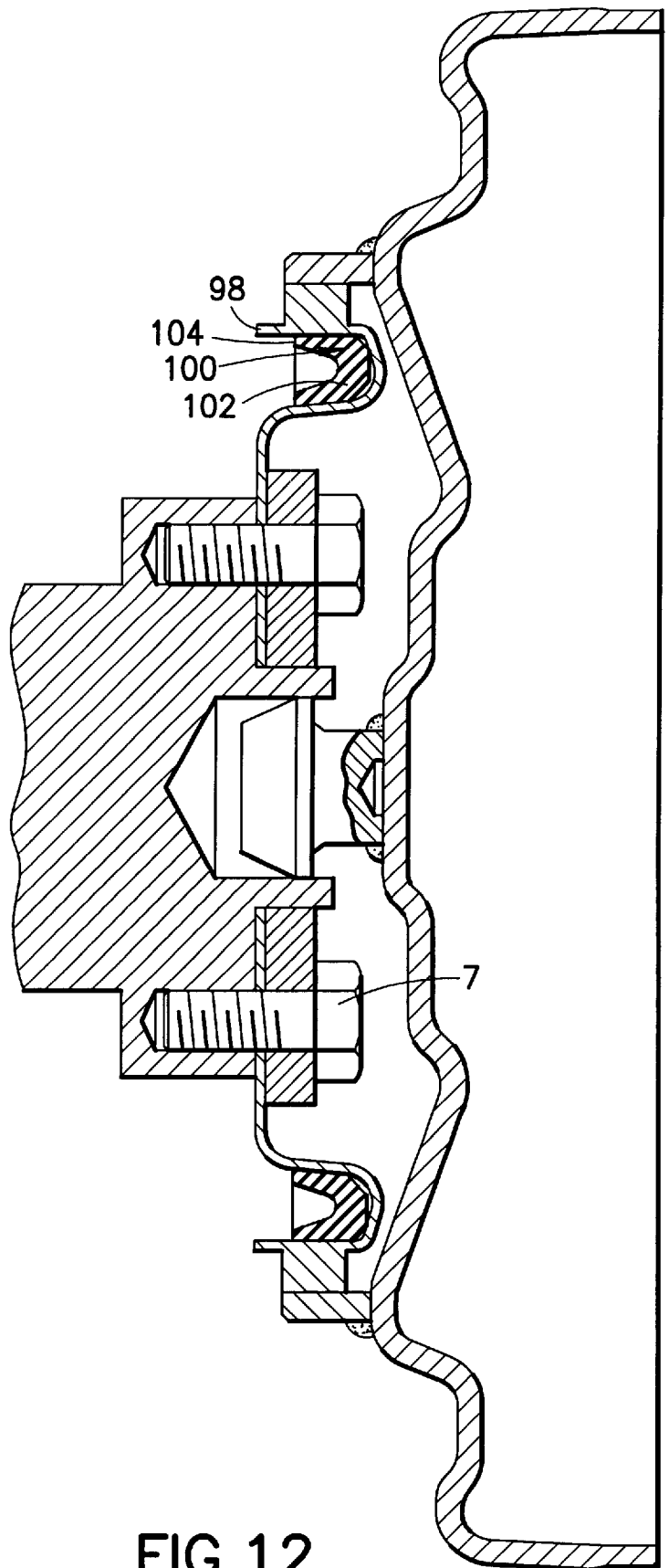
FIG. 12 is as FIG. 11, but with an additional damping means.

As an addition to the configuration shown in FIG. 11, FIG. 12 shows damping means 100 in the form of an elastomer 102, which can be inserted into a free space 104 in the spring turn 96 of the radial flange 13. Both an annular configuration of the elastomer as well as individual elastomers arranged at predetermined circumferential distances from one another are feasible.

Figure 13:
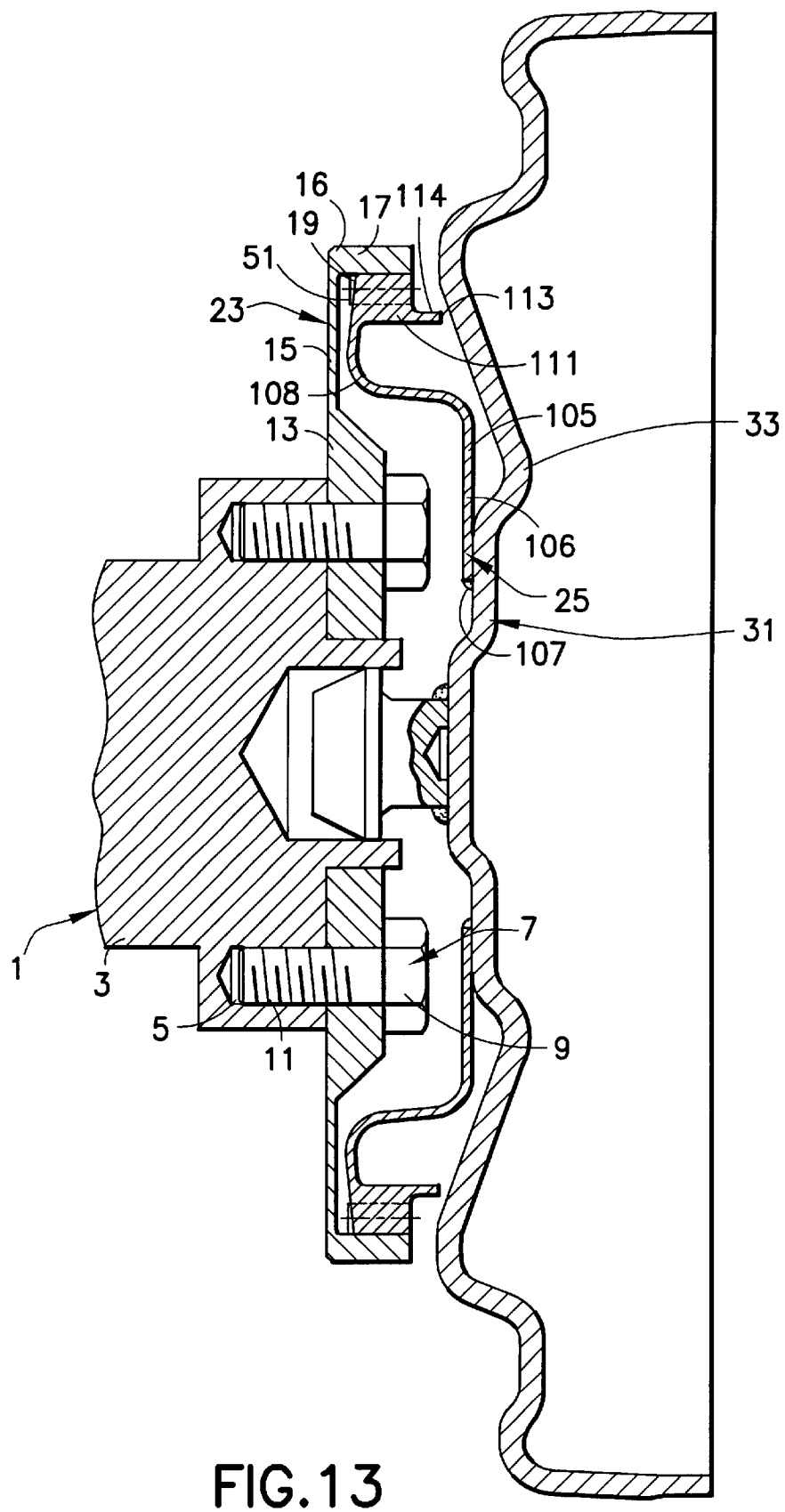
FIG. 13 is as FIG. 1, but with a driver and holder having a different physical design.

While the holder 25 has always surrounded the driver 23 in an annular shape in the exemplary embodiments described so far, FIG. 13 shows a different embodiment, in which the holder 25 is formed by a support 105, which is attached by means of a weld bead 107 to the primary flange 33 of the converter housing 35. This support 105 is designed as an axially elastic flange 106 and is provided in the radially outer region with an elastic spring turn 108. In the embodiment shown in FIG. 13, this has a cross section like the letter "C", with the radially outer limb of this spring turn 108 acting as the axial attachment 111 which is fitted (in the circumferential region) with the tooth system 51 of the holder 25 and, facing the converter housing 35, has a free end 113 which is provided radially on the outside with a bearing surface 114 for an installation apparatus 70 as is described, for example, in FIGS. 4 to 10. In the case of this installation apparatus, since there is a lever arm between the free end 113 and the axially elastic flange 106, the free end 113 can be designed to produce a force that is less than the radial prestressing force which pushes the tooth system 51 radially outward into the tooth system 19, which is formed on the inner circumference of the axial attachment 17 of the driver 23. There is no need for any additional axial securing device in this embodiment either, owing to the relatively high radial force between the tooth systems 19, 51.

FIGS. 14 to 23 show a further embodiment of an installation apparatus 70 which can be used, in particular, with an embodiment of the driver 23 which is likewise shown in FIGS. 14 to 23. However, it should be mentioned that this installation apparatus 70 can likewise be used with the embodiments of the driver described above, in particular with the embodiments shown in FIGS. 11 to 13.

First of all, it can be seen that, in contrast to the versions described above, the driver 23 (which may be formed, for example, from spring steel) is designed with a central, disk-like region 11 5, to which a large number of tongues 116 (which are designed like springs) are connected successively in the circumferential direction. The radially outer region of each of the tongues 116 is fitted with a tooth of the tooth system 19, in which case each of these teeth may have the configuration described in detail above. In particular, once again, each of the spring tongues 116 has the axial attachment 17 on which a respective tooth is then supported, extending radially outward. Furthermore, each tooth of the tooth system 19 is assigned a gap between two teeth of the tooth system 51 on the holder 25, so that the teeth of the tooth systems 19, 51 can be engaged with one another in the manner described above. It is obvious that an axial fixing means can also be provided with such a configuration of the driver 23, as has been described, for example, with reference to FIG. 11.

The installation apparatus 70 illustrated in FIGS. 14 to 23 comprises two ring elements 110, 112 which are mounted on the bearing surface 99, in the region of the free end 98 of the axial attachment 17, such that they can rotate. In particular, it can be seen that the ring elements 110, 112 are held on the individual axial attachment 17 such that they are fixed axially between the teeth of the tooth system 19 and a fixing projection or securing projection 120, which can be produced, for example, by forming, peening or the like of the free end 98 of the axial attachment 17. This means that the driver 23 can form a prefabricated unit with the rings 110, 112, and this unit is produced by using another tool to bend the individual springs or spring tongues 116 radially inward, before the ring elements 110, 112 are pushed on and the spring tongues 116 are then released, until the rings are held in the illustrated form on the driver 23. As can be seen in particular in the detailed views in FIGS. 18, 19 and 20, which show the configuration of the two ring elements 110, 112, these ring elements 110, 112 have a deformation formation 122 on their inner circumferential regions 124. This deformation formation 122 comprises a deformation incline 126 on the ring element 110, which deformation incline 126 is associated with each tooth of the tooth system 19, that is to say is associated with each spring tongue 116, and extends in the circumferential direction, and which is adjacent to regions 128 and 130, which in each case follow in the circumferential direction, at an approximately constant distance from the axis of rotation A. In the circumferential direction, the region 130 is then followed by a step 132, after which there is another region 128. In a corresponding manner, the ring element 112 (the majority of which is concealed in FIG. 20) has a deformation incline 134 associated with each tooth of the tooth system 19, that is to say each spring tongue 116, which deformation incline 134 is once again followed by regions 136 and 137 at an approximately constant distance from the axis of rotation A. The two rings may be designed to be identical and may be placed on one another twisted with respect to one another, so that this finally results in the arrangement illustrated in FIG. 20, in which a pair of deformation inclines 126, 134 are arranged such that they in each case extend in opposite directions, but are associated with one another.

Figure 18:
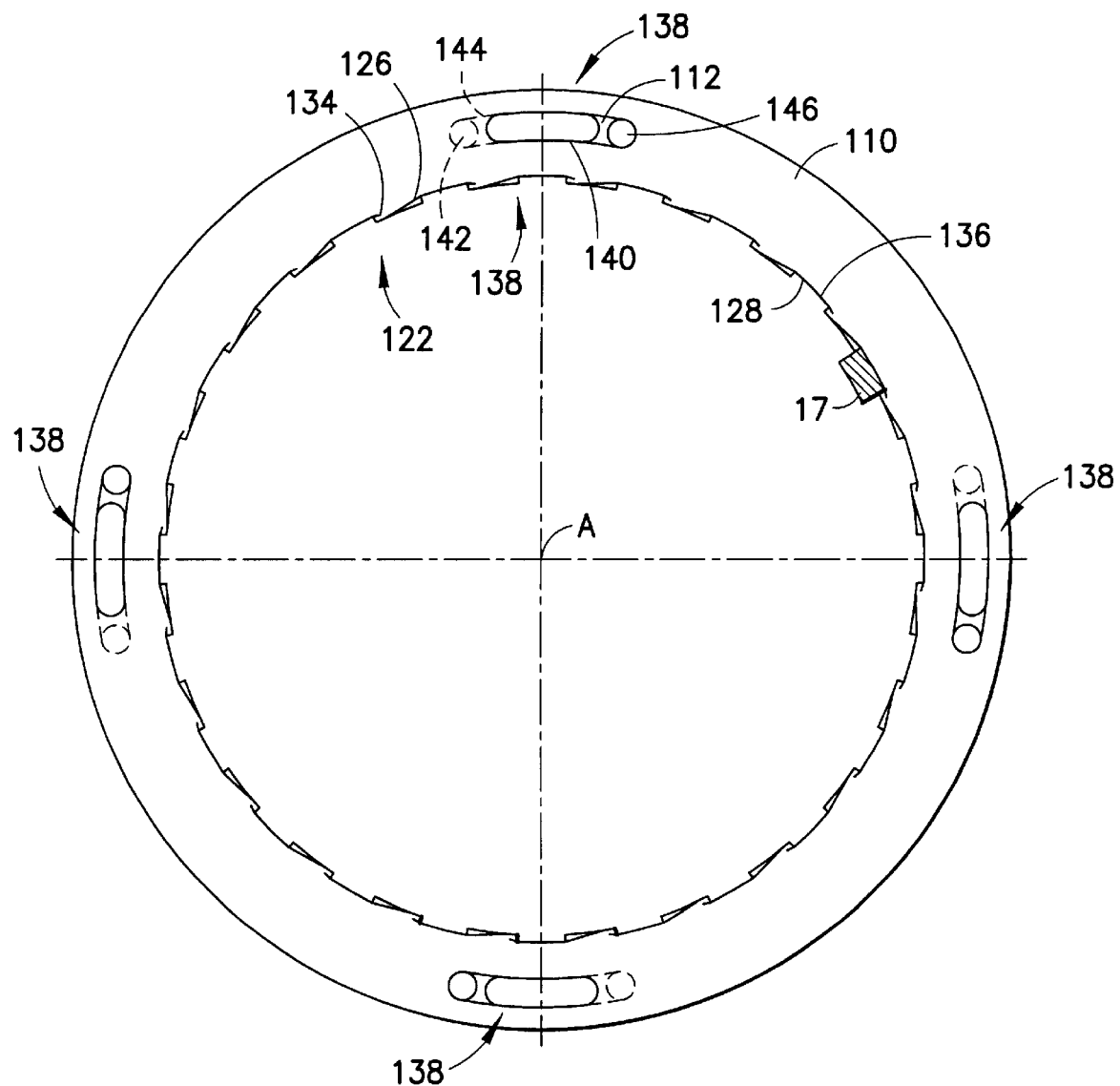
FIG. 18 shows an axial view of the two rings of the installation apparatus located one above the other.
Figure 19:
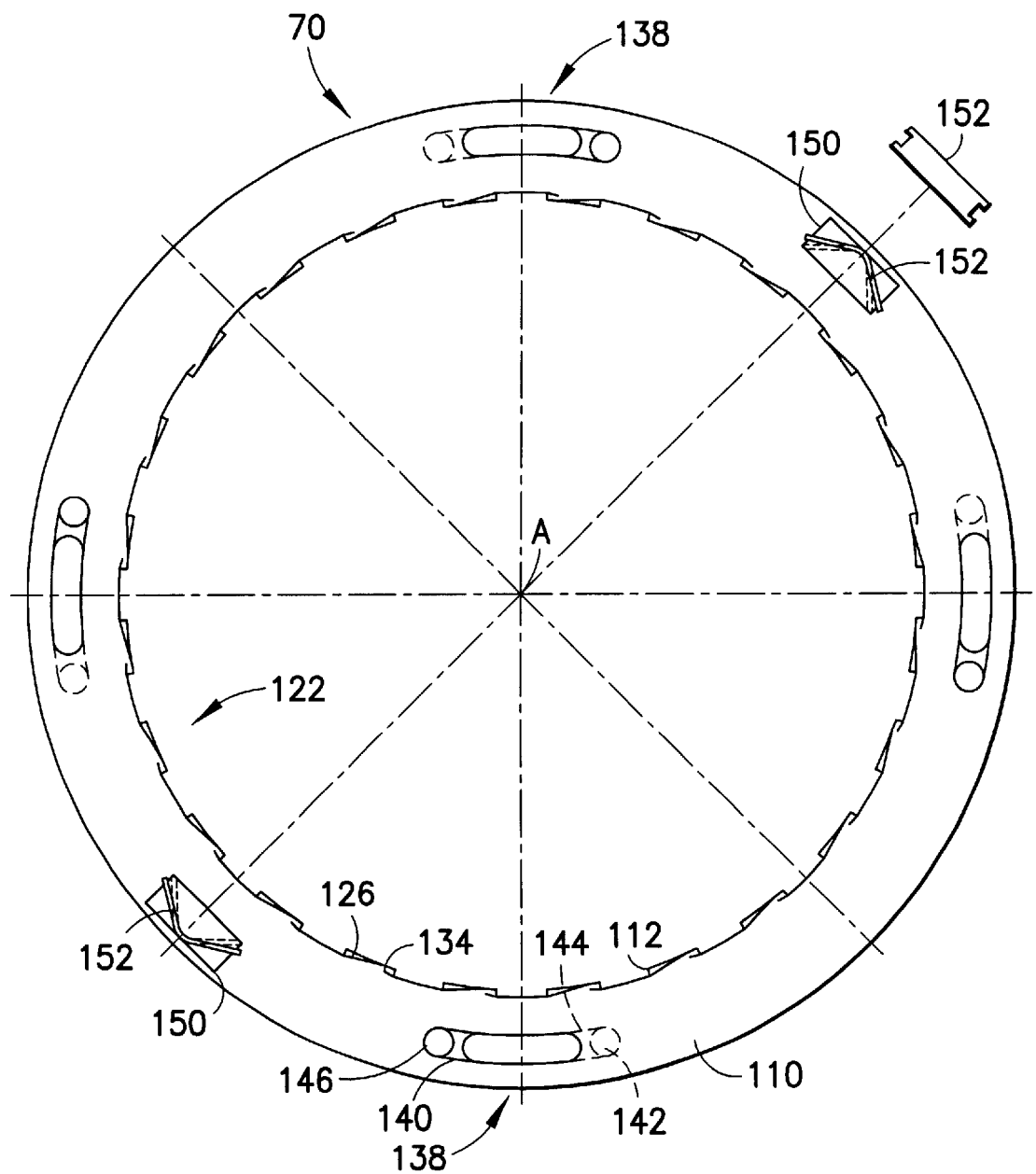
FIG. 19 shows a view corresponding to FIG. 18, in which the prestressing elements can also be seen.

As can be seen in particular in FIGS. 18 and 19, each ring element 110, 112 furthermore has an attachment formation 138, at a plurality of circumferential positions, for an operating tool. The attachment formations 138 on the ring element 110 comprise an elongated hole 140, and an opening 142 adjacent to it. In a corresponding manner, the attachment formation 138 on the ring element 112 comprises a partially concealed elongated hole 144 and an opening 146 adjacent to it. Since the two ring elements 110, 112 are designed identically and are arranged in the opposite sense to one another, part of the elongated hole 140 in the ring element 110 is located above the elongated hole 144 in the ring element 112 and, furthermore, exposes the opening 146 in the ring element 112. In a corresponding manner, the opening 142 in the ring element 110 is located above the part (which is shown only in a concealed manner) of the elongated hole 144 in the ring element 112.

Figures 20, 21:
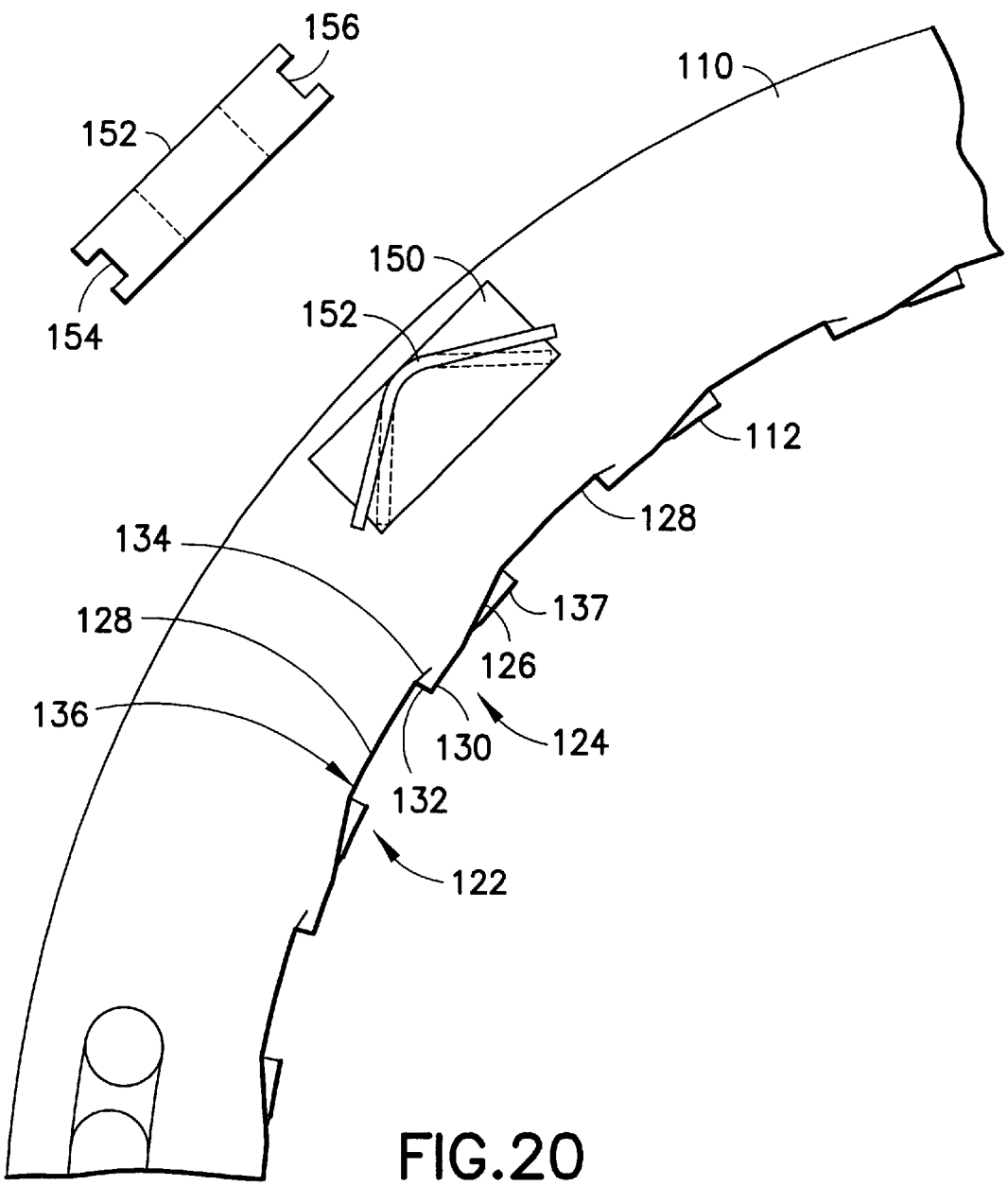
FIG. 20 shows an enlarged section of FIG. 19.
FIG. 21 shows a plan view of a prestressing spring.

The tool that is used may comprise, for example, two pins or sections that are roughly parallel to one another and can be moved toward one another; for example, these may be two spring end sections connected via a spiral or helical spring turn. For operation, these two sections are inserted into the openings 142, 146 in the ring elements 110, 112, which are accessible through the elongated holes 140 and 144, respectively, and the two ring elements 110, 112 can be rotated with respect to one another in the circumferential direction by moving the two sections toward one another. Since those sections of the operating tool which pass through the openings 142, 146 furthermore respectively engage in the elongated holes 144, 140 in the other respective ring element 112, 110, this does not prevent the two ring elements 110, 112 from being rotated, even if the two end sections are pushed completely through the openings 142, 146. It should be mentioned that, in this case, FIGS. 18, 19 and 20 show a situation in which the axial attachment 17 of the respective spring tongues 116 are located in the region of the sections or regions 128, 136, that is to say have been moved radially outward. This situation is likewise shown in FIGS. 15 and 17. It can be seen there that the teeth of the tooth system 19 engage essentially completely between two respective teeth of the tooth system 51.

Figure 17:
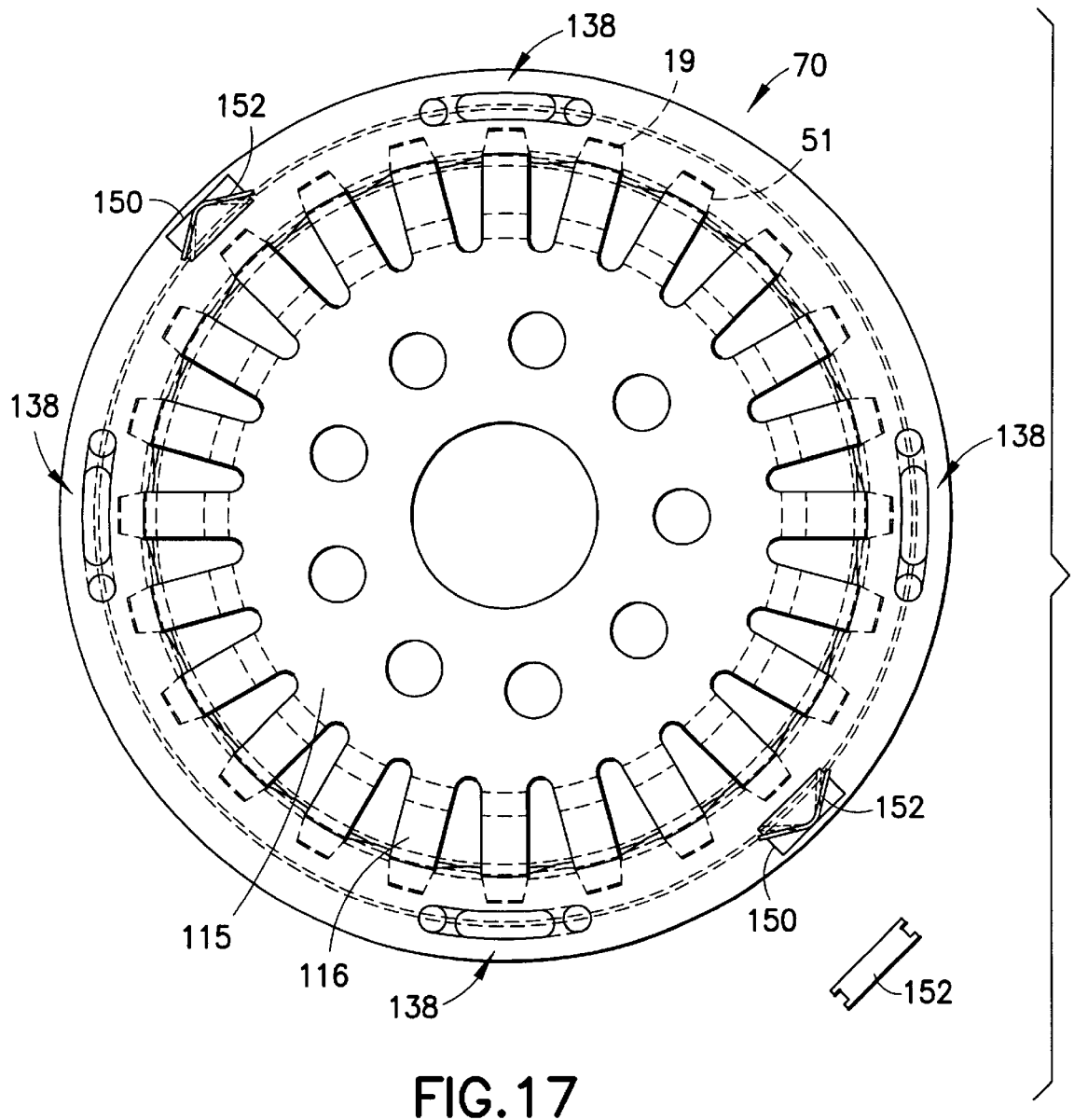
FIG. 17 shows a view corresponding to FIG. 15, in which prestressing elements can also be seen.

As can be seen, for example, in FIGS. 17, 19, and 20, the two ring elements 110, 112 may each have mutually associated recesses 150, which are located one above the other in the relative rotation position shown in FIGS. 17, 19 and 20. Leaf spring elements 152 designed essentially with an H-shape are arranged in these recesses 150, hold the two ring elements 110, 112 together axially by means of respective notches or depressions 154, 156 and, furthermore, cause the ring elements 110, 112 to be prestressed to the relative rotation position shown in FIGS. 17, 19, 20.

Figure 14:
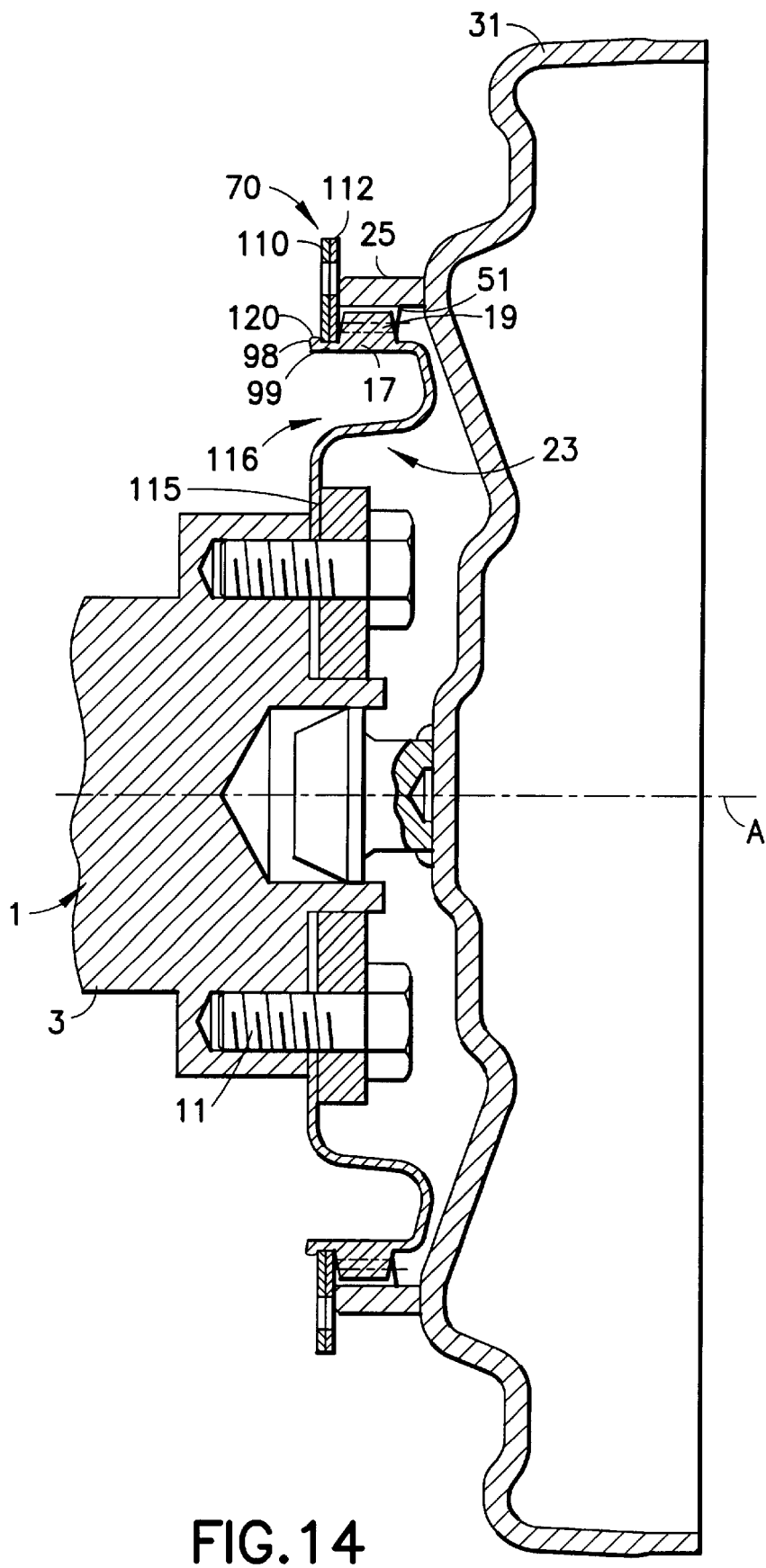
FIG. 14 shows a view corresponding to the illustration in FIG. 11, with an alternative embodiment of an installation apparatus.
Figure 15:
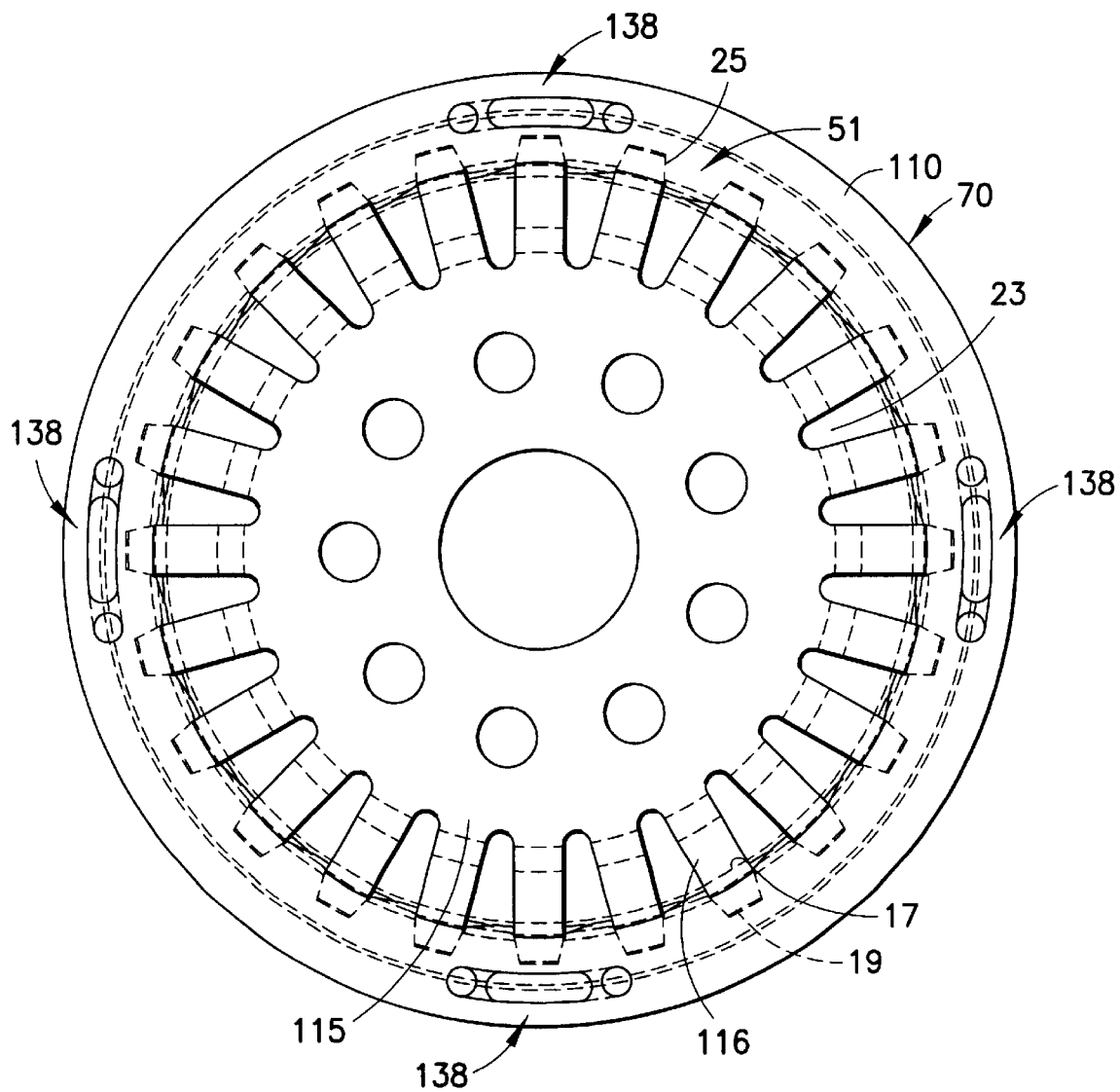
FIG. 15 shows a simplified axial view of the illustration in FIG. 14 viewed from the right in FIG. 14, and in the coupled state.
Figure 16:
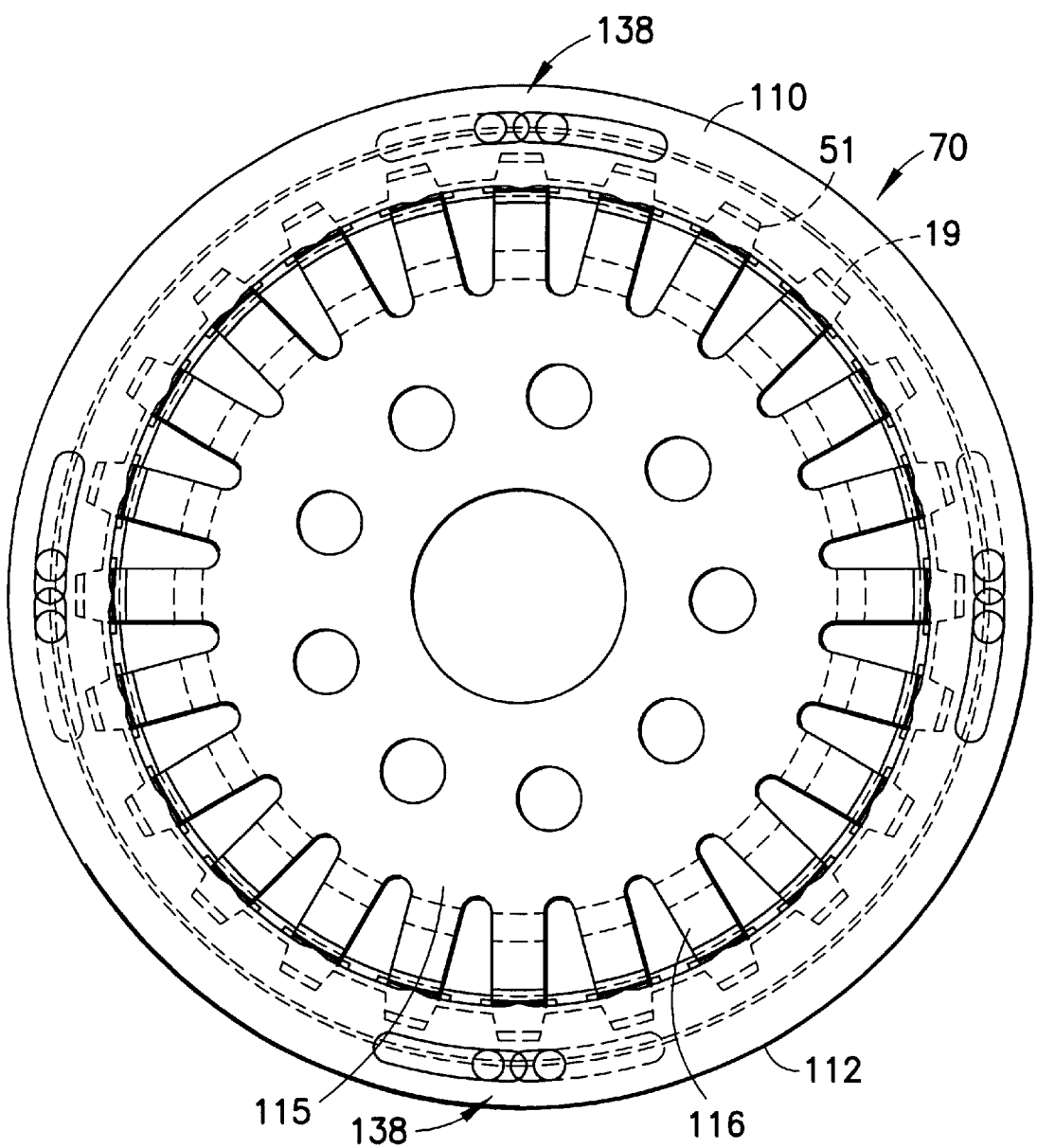
FIG. 16 shows a view corresponding to FIG. 15, but not in the coupled state.
Figure 22:
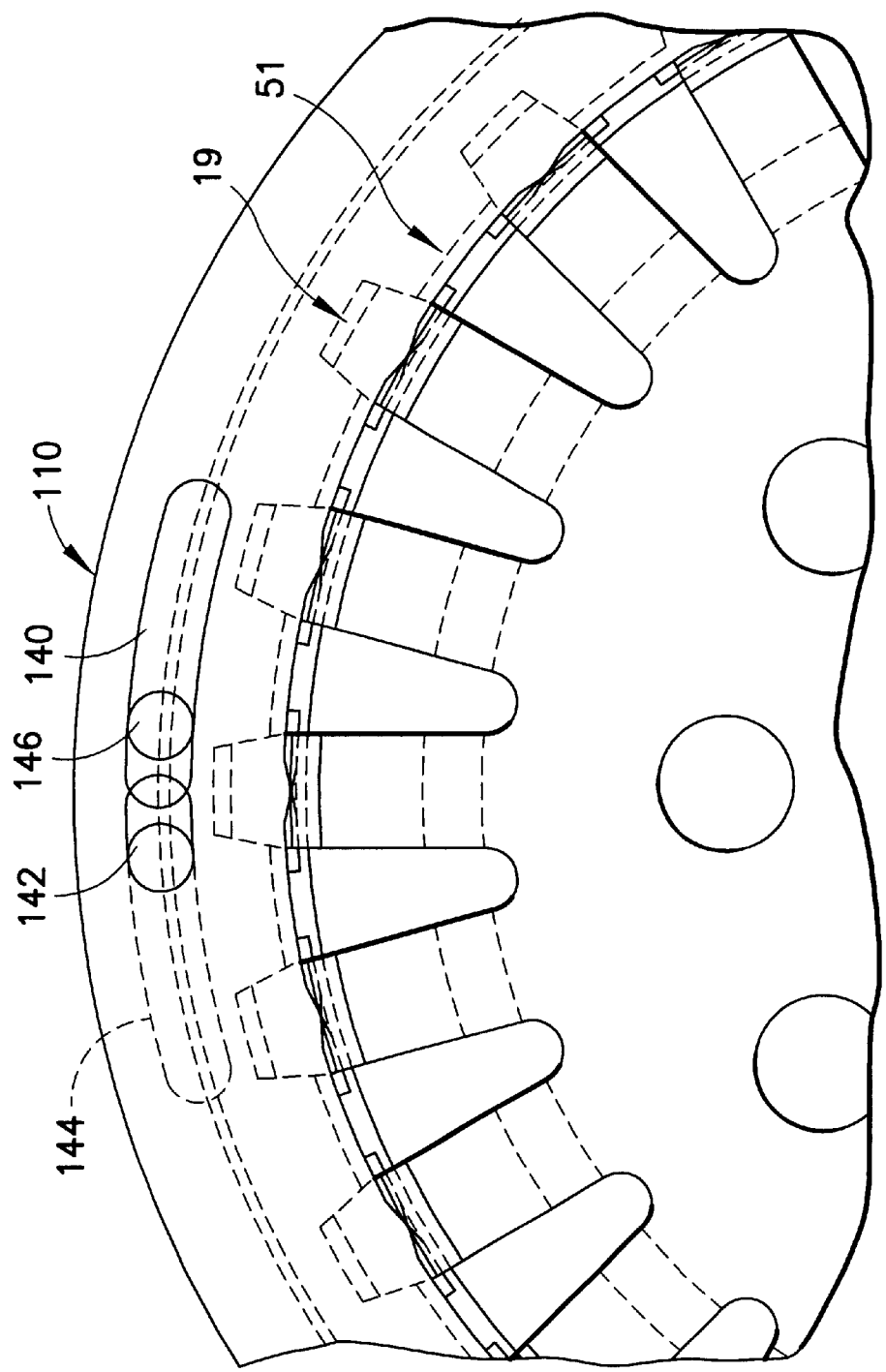
FIG. 22 shows an enlarged section of FIG. 16.
Figure 23:
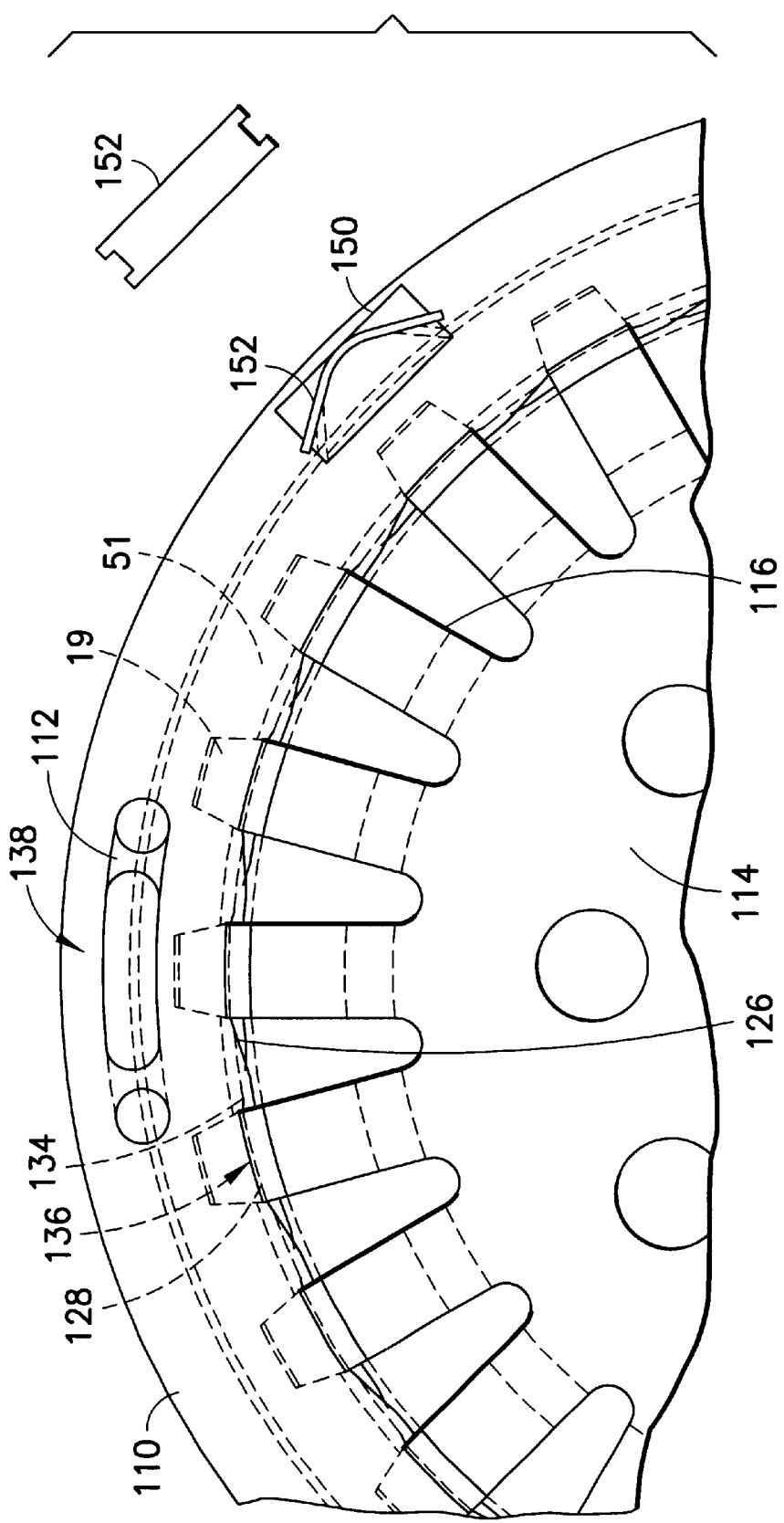
FIG. 23 shows an enlarged section of FIG. 17.

In order to release this coupled engagement starting, for example, from the position shown in FIG. 14 in which the two tooth systems 19, 51 are completely engaged with one another, in which case, in this situation, the two ring elements 110, 112 likewise assume the relative position with respect to one another shown in FIGS. 15, 17, 18, 19, 20 and 23, the two sections of an operating tool are inserted into at least one of the attachment formations 138, that is to say such a section is inserted into each of the openings 142, 146. The two sections are then moved toward one another in the circumferential direction, in an opposite direction to the prestress produced by the leaf-spring elements 152 (if these are present), with the consequence that the sections which are engaged in the openings 142, 146 move in the elongated hole 140, 144 respectively provided in the other ring element 110, 112 until, in the end, the relative rotation position of the ring elements 110, 112 shown in FIGS. 16 and 22 is reached. While this relative rotation is being carried out, the individual deformation inclines 126, 134 (which are each associated with one of the teeth of the tooth system 19) each move along an associated outer edge of the bearing surface 99 of the axial attachment 17, and lead to this outer edge, and thus the entire axial attachment 17, being pushed radially inward. This means that, as can be seen in particular in FIG. 22, the teeth of the tooth system 19 are likewise moved radially inward, and the mutual radial prestressing between the tooth systems 19, 51 is thus canceled, and, owing to the wedge-shaped design of the tooth systems, this now allows slight axial movement of these tooth systems, that is to say of the driver 23 and of the holder 25, with respect to one another. After axial removal from the driver 23 and the holder 25, the tool which was inserted into the openings 142, 146 can be released, so that the leaf-spring elements 152 cause the ring elements 110, 112 to be rotated with respect to one another once again such that the deformation inclines 126, 134 slide in the opposite direction on the bearing surface region 99, and the axial attachments 17 are then moved radially outward again by the spring elasticity of the spring tongues 116 until, in the end, the position of the tooth system 19 shown in FIGS. 15, 17 and 23 is reached once again—but without the tooth system 19 now having to engage in the tooth system 51.

In this case, an arrangement could also be produced here, for example, in which the leaf-spring elements 152 are not provided, but which ensures that, for example in the situation illustrated in FIG. 22, the regions 130 and 137 are not aligned with the bearing surface 99 in the circumferential direction, but in which these deformation inclines 126, 134 still act on the axial attachments 17 so that, once the two ring elements 110, 112 have been released by removal of the tool, the radially outwardly directed prestressing of the axial attachments 17 results in the ring elements 110, 112 necessarily being rotated to the position which is shown, for example, in FIG. 23. This means that it is possible to dispense completely with regions 130, 137 in such a configuration.

It should be mentioned that, when the spring tongues 116 and/or axial attachments 17 reach the position where they have been moved inward, as is shown, for example, in FIG. 22, it is not possible for the ring elements 110, 112 to fall off the driver 23 since, in this case as well, the securing projections 120 ensure that the rings 110, 112 are held axially.

As can be seen, in the assembled state, the ring elements 110, 112 can at the same time define an axial stop for the holder 25, that is to say the position in which the holder 25 and the driver 23 have been pushed toward one another to the maximum extent, in which case, of course and as already stated above, axial securing devices can be provided in the region of the tooth systems. The axial clamping of the ring element 110, 112 between the holder 25 and the securing projections 120 furthermore has the advantage that chattering noise during operation resulting from the ring elements 110, 112 knocking against one another can be avoided, even if the ring elements 110, 112 remain permanently in the assembled state on the driver 23.

One modification of the embodiment described above is shown in FIG. 24. The design differs from that described above only in that the two ring elements 110, 112 of the installation apparatus 70 are curved toward one another in their radially outer regions, resulting in a dish-like structure. This thus additionally results in a force component being introduced which pushes the two ring elements 110, 112 axially apart from one another and which, by interacting with the axial clamping between the holder 25 and the securing projections 120, provides additional protection against chattering noise.

Figure 24:
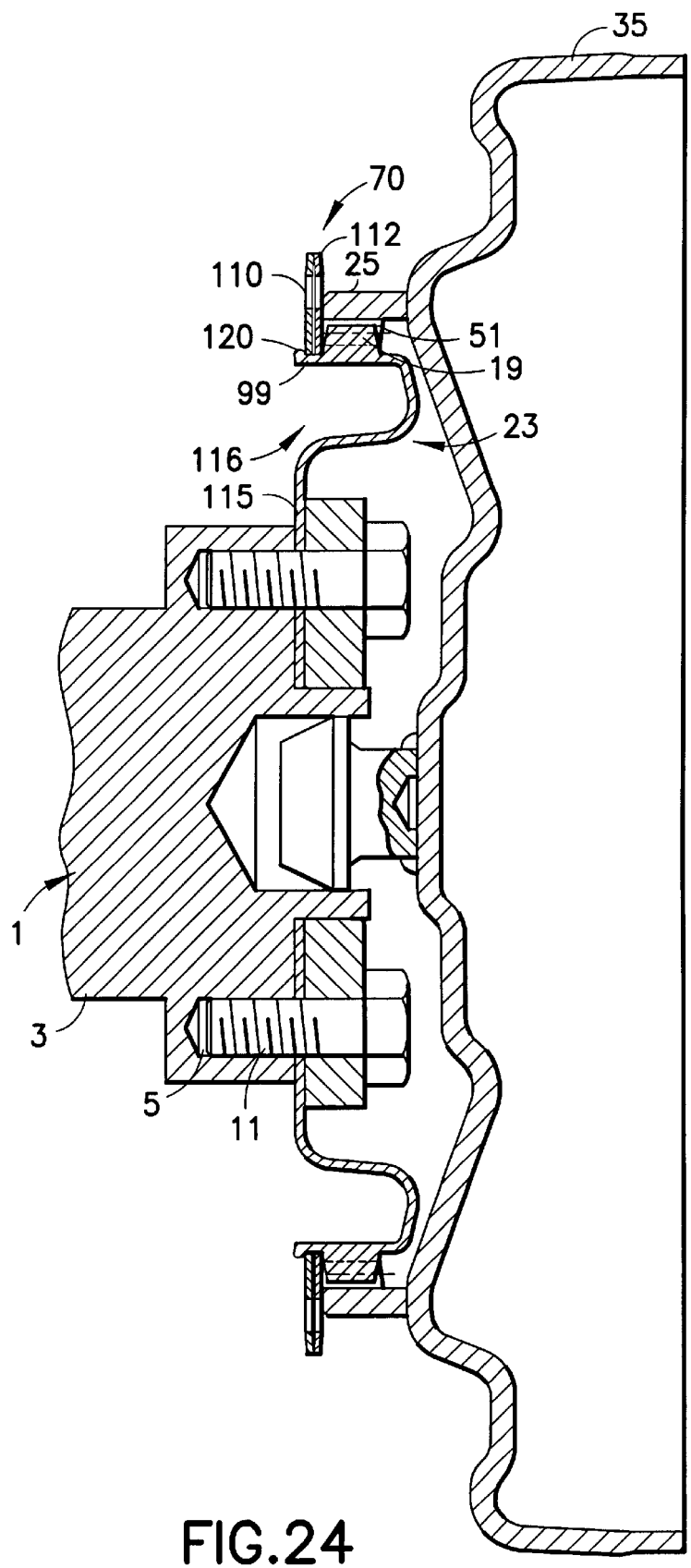
FIG. 24 shows a view, corresponding to FIG. 14, of a further alternative embodiment of the installation apparatus.
Figure 25:
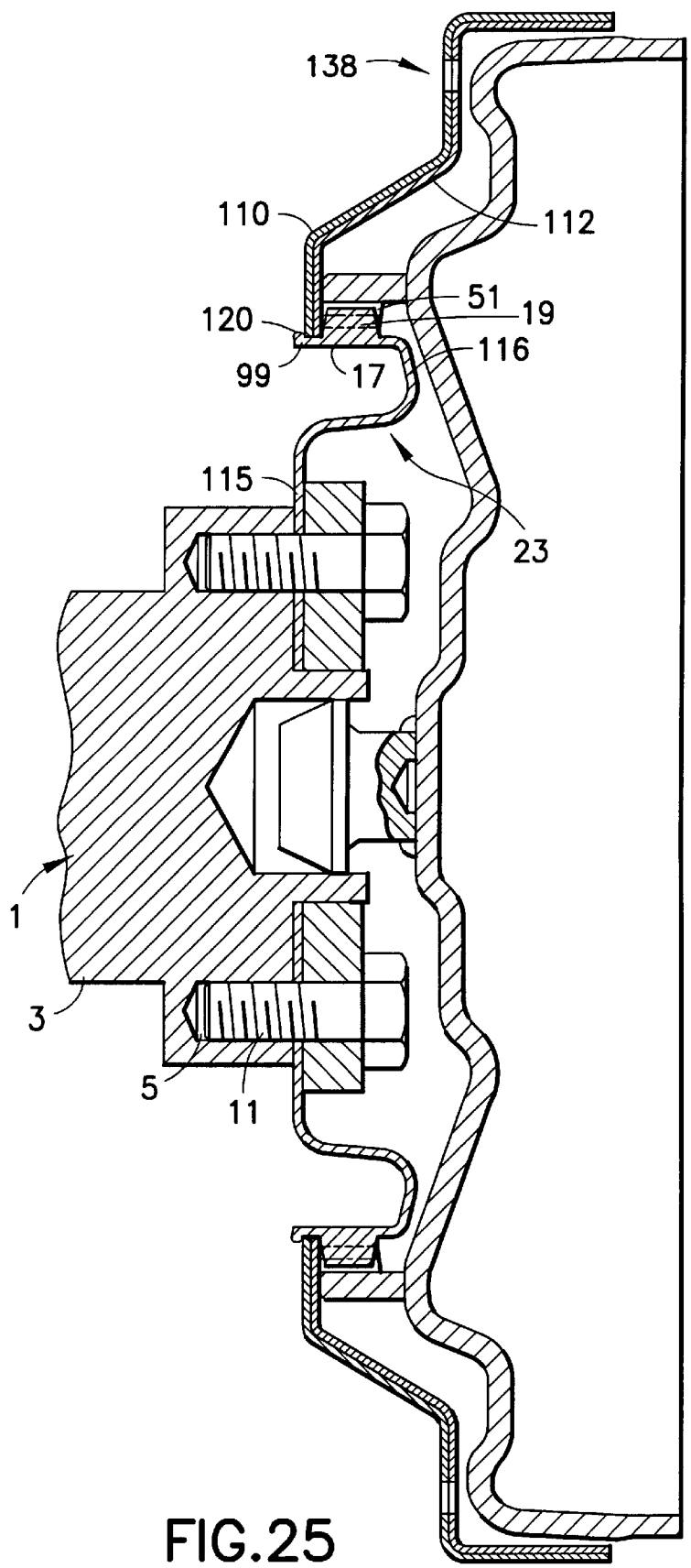
FIG. 25 shows a further view, corresponding to FIG. 14, with a further embodiment of an installation apparatus according to the invention.

FIGS. 14 and 24 each show embodiments in which the ring elements 110, 112 can be stamped out of sheet metal, as stamped parts. FIG. 25 shows an embodiment in which the ring elements 110, 112 are formed, for example, as drawn parts and assume a structure roughly in the shape of a pot. This means that they initially extend radially outward from the region in which they interact with the axial attachments 17 and are then inclined slightly in the axial direction and radially outward, before entering a further radially extending region in which the individual attachment formations 138 for the tool may be located, and may extend from there even further in the axial direction, as indicated by a dashed line. The advantage of such an embodiment is that this provides greater freedom of choice with regard to the region in which the attachment formations 138 can be arranged. For example, by arranging these attachment formations radially further outward, they can be accessed more easily by the operating tool. In this case, it would also be possible to arrange the attachment formations 138 in the radially outer and axially extending region. Due to the lever ratios that this results in, this furthermore has the advantage that it is easier to produce the force required to deform the individual spring tongues 116 radially inward.

It should be mentioned that, as illustrated, the individual attachment formations 138 are preferably provided at angular intervals of 90°, so that the ring elements 110, 112 can be influenced from various circumferential regions. However, any other desired positioning and any other number of attachment formations are possible. In addition, any other desired number of such prestressing leaf-spring elements is feasible for the leaf-spring elements 152 which are preferably arranged in pairs with an angular interval of 180°.

In principle, it should also be mentioned that the illustrated embodiments of the installation apparatus 70 with two ring elements 110, 112 are particularly preferred, since a relative rotation movement, and thus the operation of the axial sections 17 are then achieved simply by moving two sections of an operating tool toward one another. However, in principle, the installation apparatus 70 may also be formed from a single ring element, for example the ring element 110, which can then be rotated on its own with respect to the driver 23 by means of an appropriate operating tool, in order, by means of the deformation inclines 126, to move the axial detachments 17 radially inward and to release them radially outward by turning in opposite direction. In this case, before the driver 23 and the holder 25 are assembled, the driver 23, for example, would have to be fixed and the ring element 110 then turned until the regions 130 are each located above the individual bearing surfaces 99, and the ring element 110 cannot be turned back inadvertently. Then, once the driver 23 has been moved axially toward the holder 25 and the teeth of the tooth system 19 have already engaged between the teeth of the tooth system 51, the ring element 110 can be rotated in the opposite sense with the cover of the torque converter being fixed, that is to say with the holder 25 being fixed, so that the axial attachments 17 are released. In order to release this coupled engagement, the ring element 110 is then rotated again with the holder 25 being fixed, in order to move the axial attachments 17 radially inward.

It should be mentioned once again that the embodiments of the installation apparatus 70 shown in FIGS. 14 to 25 can also be used with drivers of a different design and, in particular, the driver need not be designed, as described above, with spring tongues. This means that such an installation apparatus 70 could also be used with a driver as is shown in FIG. 1.

Furthermore, it should be mentioned that a plurality of teeth of the tooth system 19 can be provided on each spring tongue 116, so that the deformation inclines associated with these spring tongues 116 can move a group of teeth radially.

FIGS. 26 and 27 once again show a tooth system component, in this case the driver 23, as can be used for a coupling device as described above, and which is also illustrated, for example, in FIG. 11 or FIGS. 14, 24 and 25.

This driver 23 has a body region 115 which is designed essentially like a circular ring and in which the openings or holes 117 are provided for attaching it, for example, to a crankshaft flange or the like. The projections 116 or spring tongues 116 in each case project in the radial direction from the body region 115. It should be mentioned that such a driver 23 is preferably stamped from a spring-steel blank, and is then bent to the illustrated shape.

The required spring elasticity to make and break coupled engagement on the one hand, and the required radial prestressing force to maintain the coupled state on the other hand, are thus obtained in conjunction with the special forming, which will be described below. As can be seen in particular in FIG. 27, the projections 116 initially have a first bend region 180 originating from the body region 115, in which first bend region 180 they are bent toward the axial direction, that is to say incline at an angle in the range from 0° to 20° with respect to the axis of rotation. This first bend region 180 is followed by a first region 182 which extends essentially axially. This region 182 is followed by a second bend region 184, which bends radially outward and merges into a third bend region 186. The second bend region 184 and the third bend region 186 result in each radial projection 116 merging once again into the axial attachment 17, forming a further region which extends essentially, that is to say, approximately, axially and, originating from the associated bend region—in this case the third bend region 186—extends in the opposite direction toward the region 182 which extends essentially axially, so that these regions essentially overlap when viewed in the radial direction.

The advantage of this essentially S-shaped or swan's-neck-shaped contouring or bending of the individual radial projections 116 is that, when a radial compression or expansion is produced, these movements take place in such a manner that the axial attachments 17 essentially move only radially, but are not tilted about the third bend region 186 and then with respect to the axis of rotation A. This means that, when an installation apparatus is used corresponding to any of the various embodiments described above and movement of the axial attachments radially inward results in an influence on the free end regions of these axial attachments 17, the tooth systems 19, 51 are disengaged, or moved out of contact, roughly uniformly over their axial length, so that even a slight radially inward movement of these axial attachments 17 leads to the coupled state and the mutual contact of the teeth being broken, and the driver 23 can be moved away from the holder 25. A corresponding situation applies to the provision of the radial prestressing force. Once again, the radially outward movement of the axial attachments 17 essentially without any pivoting with respect to the axis of rotation A ensures that a uniform contact pressure is produced over the entire axial length of the teeth of the tooth systems 19, 51, so that it is largely possible to avoid load peaks at points on the teeth, in particular at the axial ends of the teeth. It should be mentioned that the individual axial attachments 17 can in this case advantageously extend at a slight angle outward with respect to the axis of rotation, starting from the third bend region 186, for example at an angle in the range up to 5°. This means that, when a radially inwardly directed force is subsequently applied to make or break the coupled state, using the tool which is attached in the region of the free ends of the axial attachments then, during the said movement which takes place radially inward, the individual axial attachments can at the same time be moved to a position parallel to the axis, or can even be pivoted beyond the position parallel to the axis, so that, when subsequently brought into contact with the tooth system on the holder 25 and when the axial attachments are released by the installation apparatus, the teeth 20 of the tooth system 19 on the driver 23 lie with their longitudinal direction approximately aligned with respect to the axis of rotation A, that is to say parallel to it.

Each axial attachment 17 is fitted with one tooth 20 of the tooth system 19. In the illustrated embodiment, the tooth 20 is produced by stamping out the spring-steel material in the region of the axial attachment 17. This stamping process can be carried out before the individual bending processes are carried out by means of suitable tools. In contrast to the embodiment shown in FIG. 25, it can be seen in FIGS. 26 and 27 that the second bend region 184 and the third bend region 186 merge into one another and form a common bend region which is curved roughly in a circular shape while, in contrast, in the embodiment shown in FIG. 25, the second bend region and the third bend region are separated by a short section, which extends essentially in a straight line, and have different radii of curvature. There is a relatively high degree of design freedom here, and it is possible to vary the spring response of the radial projections or spring tongues 116 depending on the choice of the radii of curvature of the second bend region 184 and third bend region 186, or by introducing a section which separates these curved regions 184, 186. In this case, at least for the third bend region 186, a curved region has been found to be advantageous in which the radius of curvature is in the region of 1.5 times the material thickness, or more. The radius of curvature in the second bend region 184 can also satisfy this dimensional requirement; in particular, if, as illustrated in FIG. 27, the second bend region 184 and the third bend region 186 merge into one another, it may be advantageous to provide a uniform radius of curvature.

Figure 26:
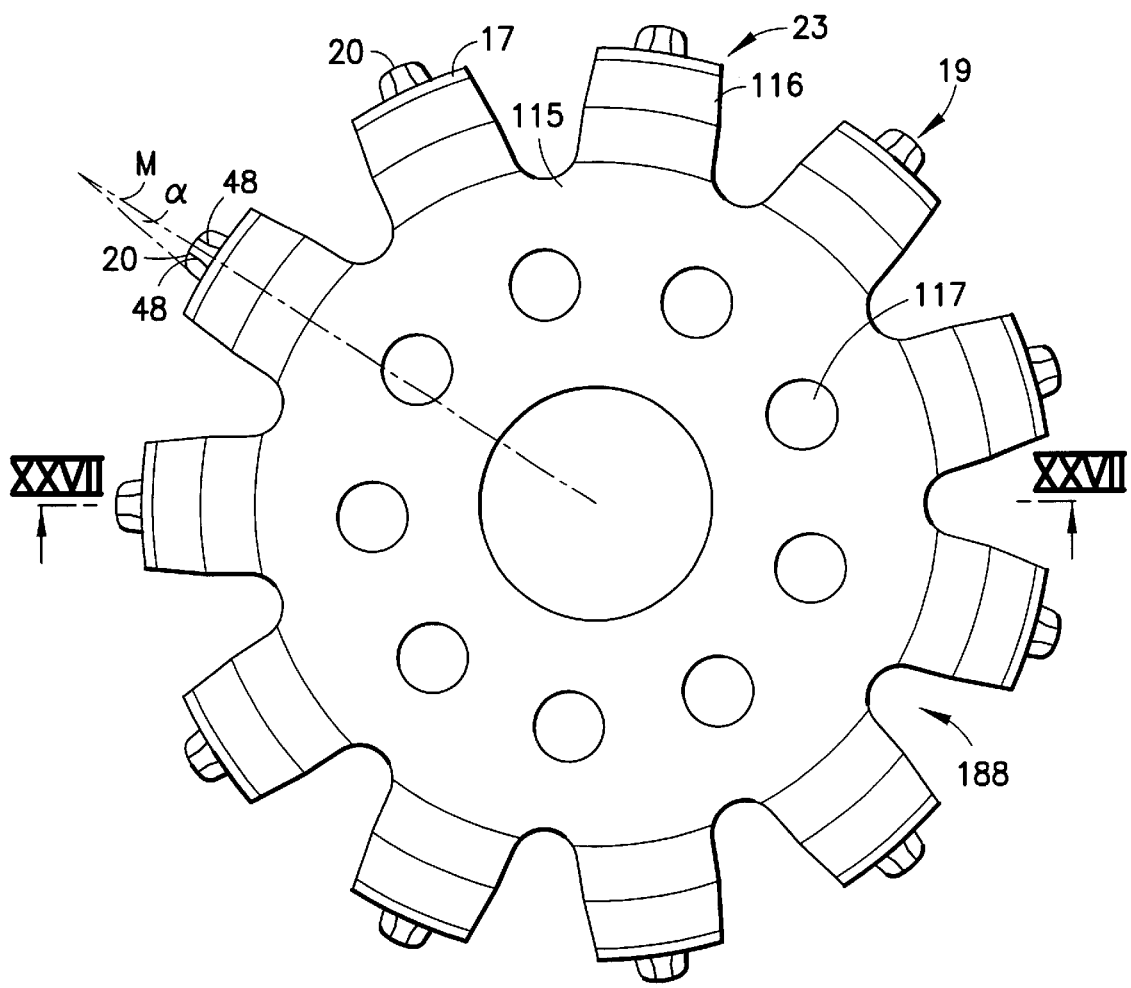
FIG. 26 shows an axial view of a tooth system element according to the invention, as a driver.
Figure 27:
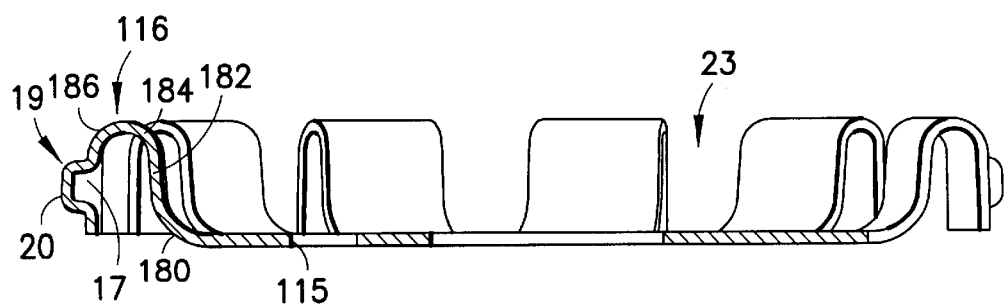
FIG. 27 shows a section view of the tooth system element from FIG. 26, along a line XXVII—XXVII in FIG. 26.

FIG. 26 furthermore shows the radial projections or spring tongues 116 being formed such that they taper radially outward. This, as well, makes a contribution to the desired spring elasticity, without affecting the torque transmission capacity. It has been found in this case that a ratio in the range from 0.5 to 1.2 is advantageous for the width in the inner region to the width in the outer region. FIG. 26 shows that different reduction rates may be provided here, that is to say the circumferential extent of the individual radial projections 116 may be reduced to a greater extent in the outer region than in the inner region. With regard to the elasticity and prestressing requirements, it has been found to be advantageous if the ratio between the circumferential extent of the radial projections 116 and the wall or material thickness of the driver 23 is in the range from 5 to 30, at least in the region of the radial projections 116, in which case, for example, a mean circumferential width of the individual radial projections can be used for comparison with the material thickness, here. It has also been found to be advantageous for a curved or circular transition to be formed for the transition between two immediately adjacent radial projections 116 via the body region 115, that is to say in the recessed regions denoted by 188 in FIG. 26, so that load peaks can be avoided. In this case, it has been found to be advantageous for the radius of curvature of the curved transition to have a value which is in the same order of magnitude as the material thickness of the driver 23, or is greater than this.

Figure 28:
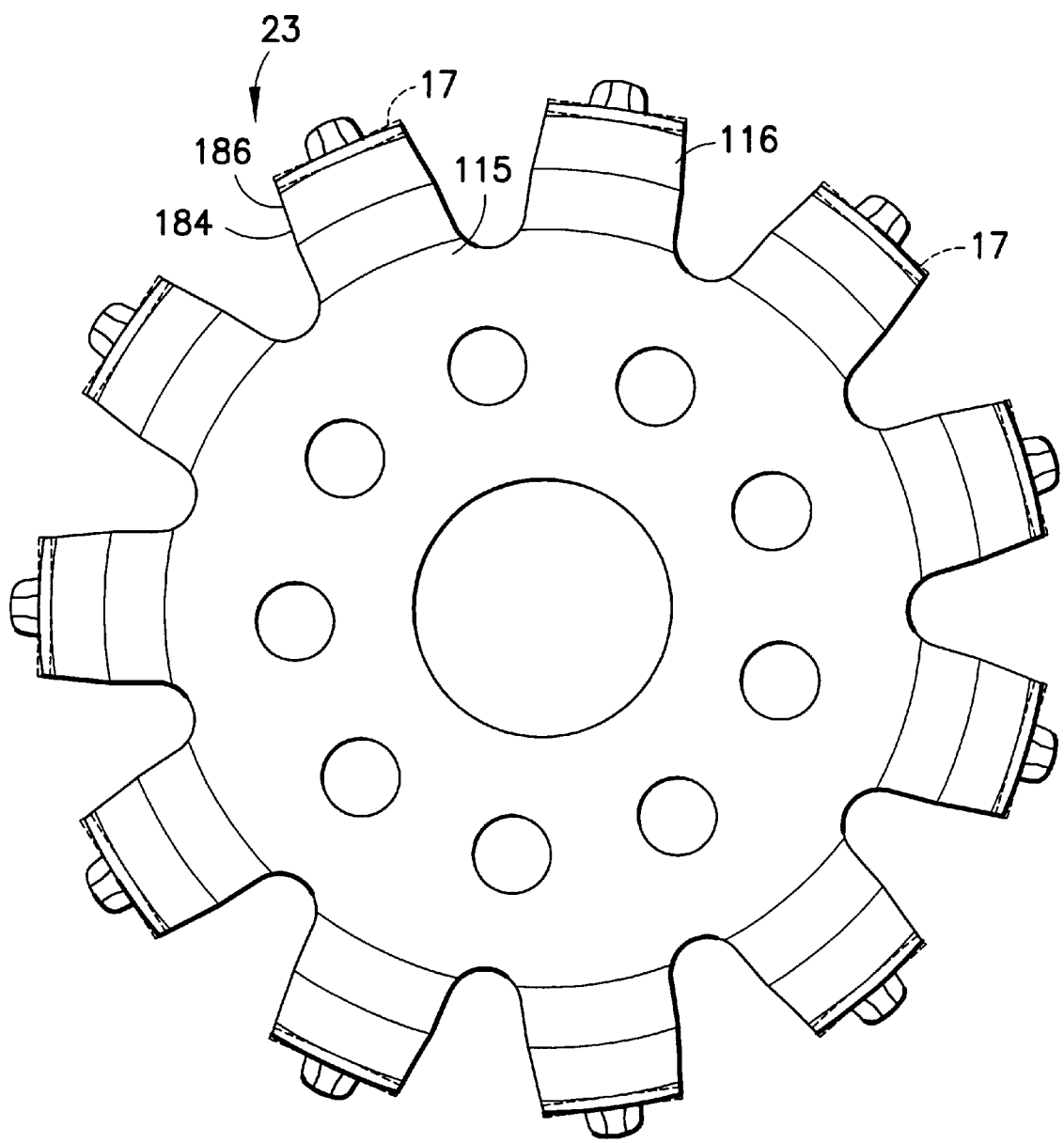
FIG. 28 shows a modification of the tooth system component illustrated in FIG. 26.

A further aspect, which is advantageous particularly with respect to the spring response of the individual radial projections 116, is shown in FIG. 28. In this figure, dashed lines indicate that the axial attachments 17 of the various radial projections 116 (which attachments are shown by a dashed line there) are now flattened starting from the circumferential contour which can be seen in FIG. 26 and is matched to a circular shape, so that lengthening of the respective axial attachments in the circumferential direction leads to a polygonal structure. This means essentially that none of the individual axial attachments 117 is curved in the circumferential direction. If such a region which is not curved in the circumferential direction extends further at least into the third bend region 186, then this leads to a situation in which the spring elasticity of the spring-steel material from which the driver 23 is made not being limited or stiffened by three-dimensional forming, as is the case in the embodiment shown in FIGS. 26 and 27 and, in particular, as is indicated for the radial projection 116 which can be seen on the left in FIG. 27, where such stiffening by the curved forming is not desirable.

The aspects described above each contribute individually, but preferably in combination, to being able to satisfy the contradictory requirements for producing an adequate radial prestressing force and for providing adequate radial elasticity for interaction with an installation tool in the best-possible manner.

A further aspect which contributes in particular to producing an adequate and reliable torque transmission coupling, is shown in FIG. 26. This shows that the flank surfaces of the teeth 20 of the tooth system 19, which point approximately in the circumferential direction, include an angle α (in a radially outward extension) with respect to a longitudinal center plane of the individual teeth 20, which plane is denoted by M in FIG. 26 and is at right angles to the plane of the drawing there, and this angle is in the range from 10° to 50° preferably 20° to 30°. The choice of the angle α in the stated value range initially leads to the radial force component, which is produced by interacting with a complementary tooth system and by means of which the associated tooth 20 is pushed radially inward, not being so large that the two tooth systems could be disengaged in an undesirable manner. However, on the other hand, such a value for the angle α means that manufacturing or dimensional tolerances in the region of the tooth systems 19 and 51 which engage with one another do not lead to undesirable movement play, as would be the case if, for example, the tooth flanks 48 were to run parallel to the plane M or only at a very small inclination angle with respect to it. Specifically, in order to produce the engagement between the two systems, relatively major radial movements would then have to be carried out to compensate for minor dimensional inaccuracies. If the flanks 48 lie flat, even a relatively small axial movement leads to compensation for manufacturing or dimensional inaccuracies, so that dimensional inaccuracies can in each case be compensated for within an axial movement range of the axial attachment 17 which does not lead to a major change in the prestressing force, as a result of which the teeth 20 are pressed radially outward.

Figure 29:
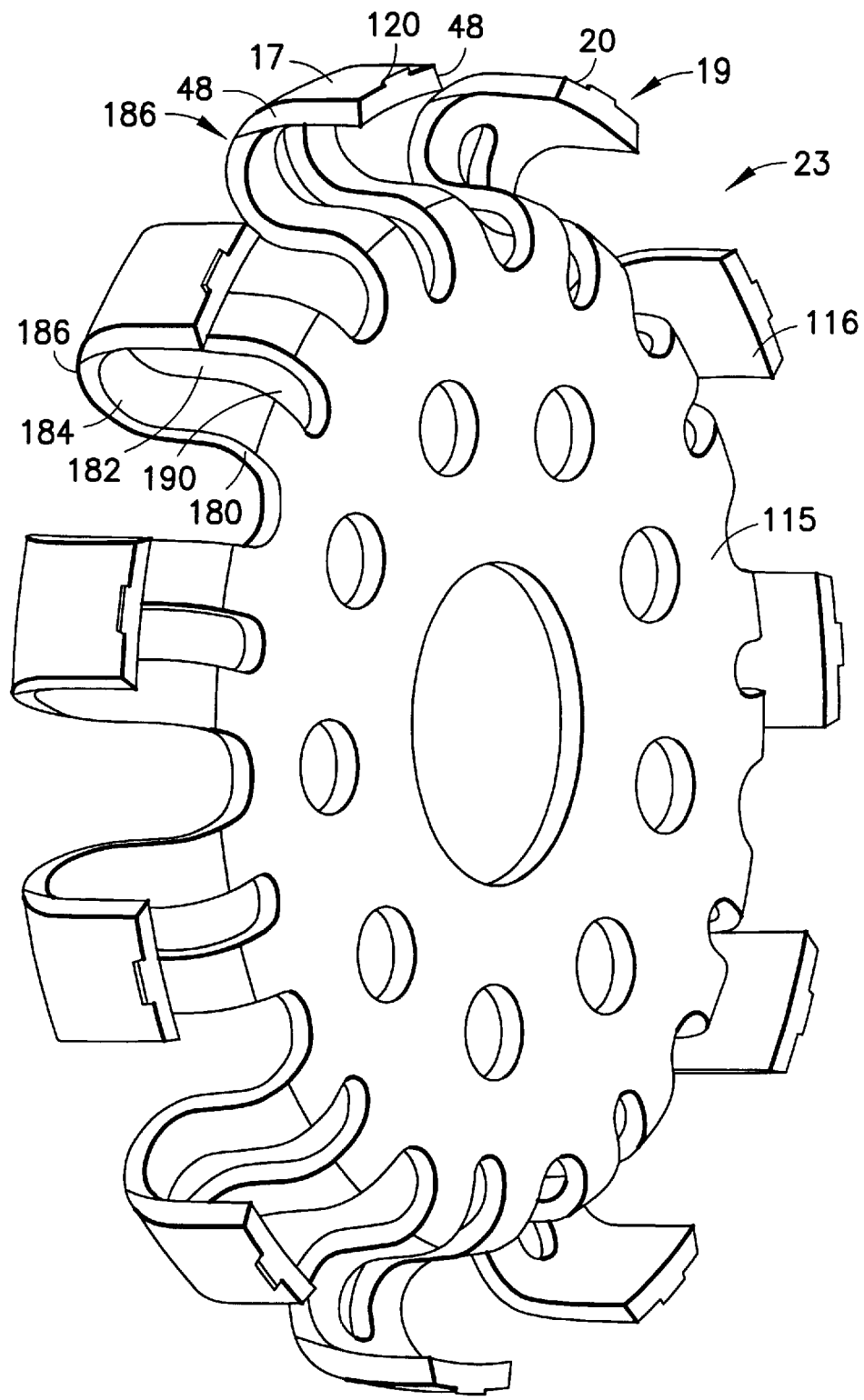
FIG. 29 shows a perspective view of a further modification of the tooth system component shown in FIG. 26.
Figure 30:
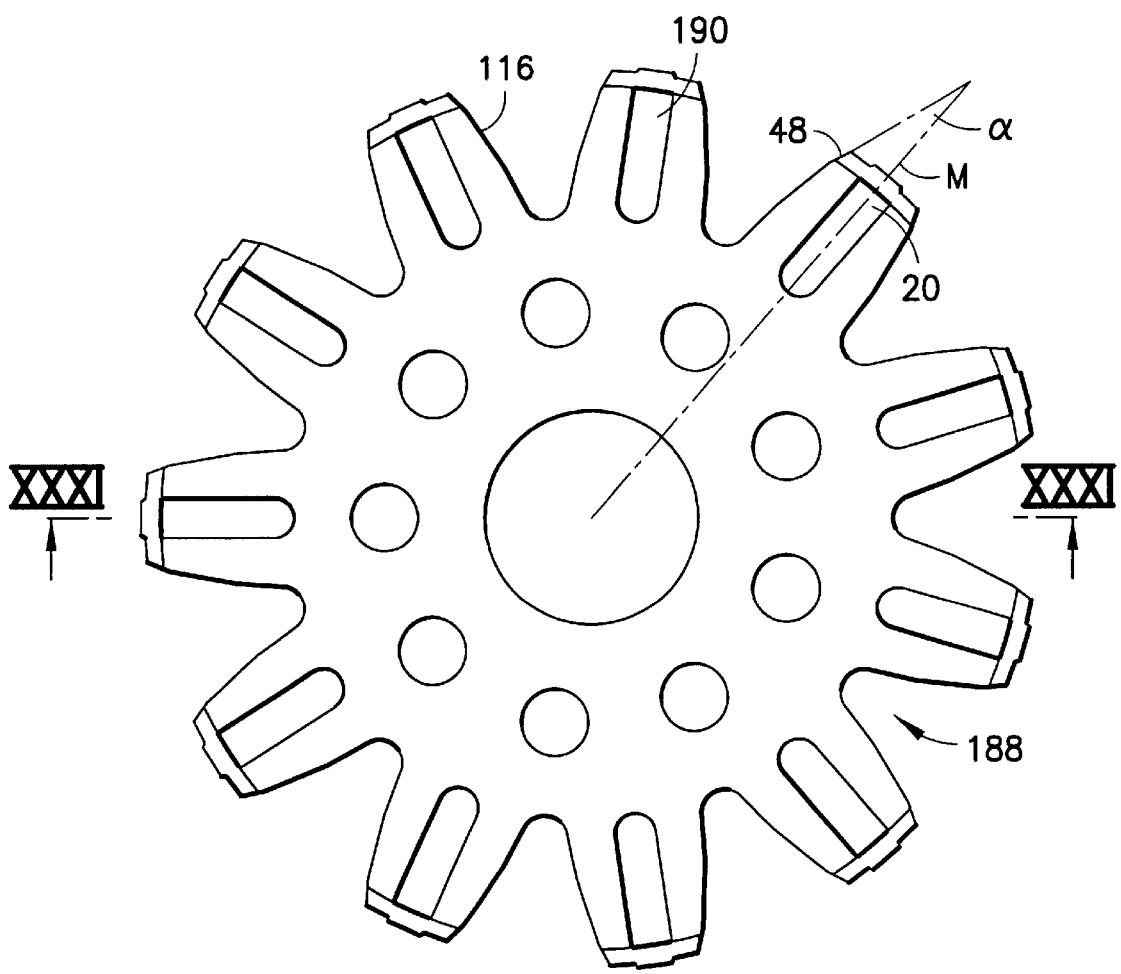
FIG. 30 shows an axial view of the tooth system component from FIG. 29.
Figure 31:
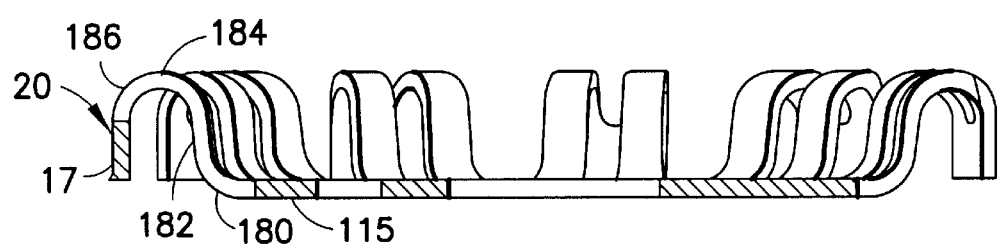
FIG. 31 shows a section view of the tooth system component from FIG. 30, along a line XXXI—XXXI in FIG. 30.

A modification of the driver 23, that is to say of the tooth system of the component 23, is shown in FIGS. 29 to 31. In this case as well, the driver 23 is essentially formed from a body region 115 having a plurality of radial projections 116 which, as described above, are bent with an approximately S-shaped or swan's-neck-shaped contour. However, it can be seen that the individual radial projections have slots 190 which originate approximately from the body region 115 and extend through the first bend region 180, the first region 182 which extends essentially axially into the second end region 184 and, possibly, even as far as the third bend region 186. Introducing such slots 190 into the individual radial projections and spring tongues 116 allows their spring response to be influenced further. In particular, the spring response can be influenced by suitable choice of the slot length, and of the slot width as well.

A further difference in the embodiment shown in FIGS. 29 to 31 is that the individual teeth 20 of the tooth system 19 of the driver 23 are no longer formed by stamped regions created on the axial attachments 17, but are formed directly by these axial attachments 17. That is to say, in the circumferential direction, the flank surfaces 48 each form bearing surfaces with the material thickness of the spring-steel sheet from which the driver 23 is constructed, and these bearing surfaces engage with complementary bearing surfaces on the tooth system 51 of the holder 25. It can be seen that these flank surfaces 48 extend into the third bend region 186, thus producing a very long axial extent for the teeth of the tooth system 19, and thus allowing the material load in the region of the tooth system 19 to be reduced.

Securing projections 120 are formed, for example by material forming, in the region of each of the free ends 98 of the axial attachments 17, by means of which securing projections 120, as was described above with reference to FIGS. 14 to 25, the ring elements 110, 112 of the installation apparatus 70 can be held on the driver 23.

It should be mentioned that the advantages described above can be obtained by appropriate design of the flank surfaces 48 on the axial attachments 17 together with the inclination angle α with respect to the longitudinal center plane M of the respective teeth 20.

It can be seen in FIGS. 29 to 31 that, in this embodiment as well, it is advantageous for the radial projections 116 to be formed with a reducing circumferential extent toward the outside. It should furthermore be mentioned that the dimensional details described above can also be applied in an advantageous manner to the various radii of curvature and transition regions.

It should be mentioned that the driver 23 as is illustrated in FIGS. 26 to 31 can be used in all the embodiments of a coupling device described above with reference to FIGS. 1 to 25. This relates both to use as a driver, as has been described comprehensively above, and to use as a holder, as is shown, for example, in FIG. 13.

Figure 32:
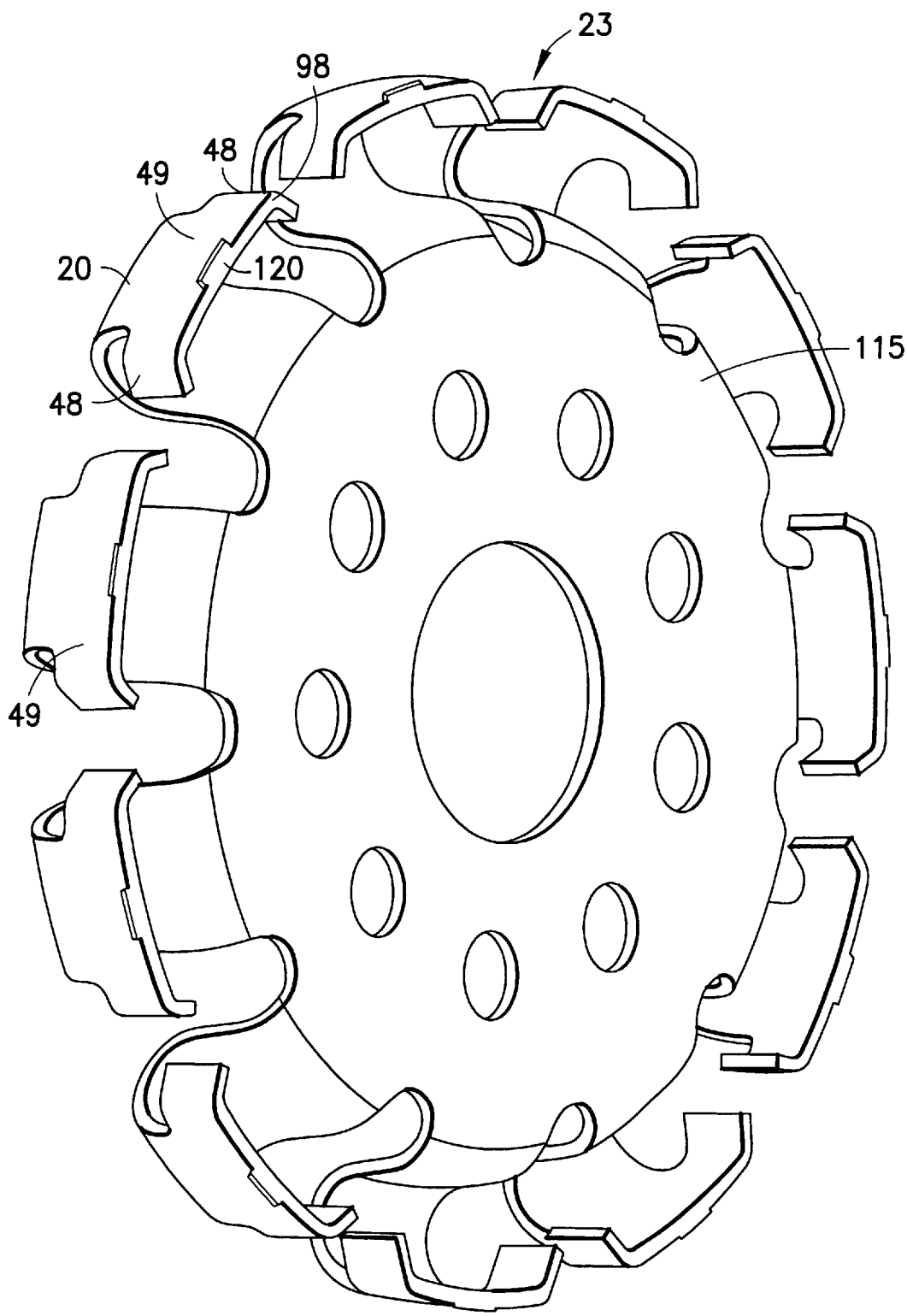
FIG. 32 shows a perspective view of an alternative embodiment of a tooth system component.
Figure 33:
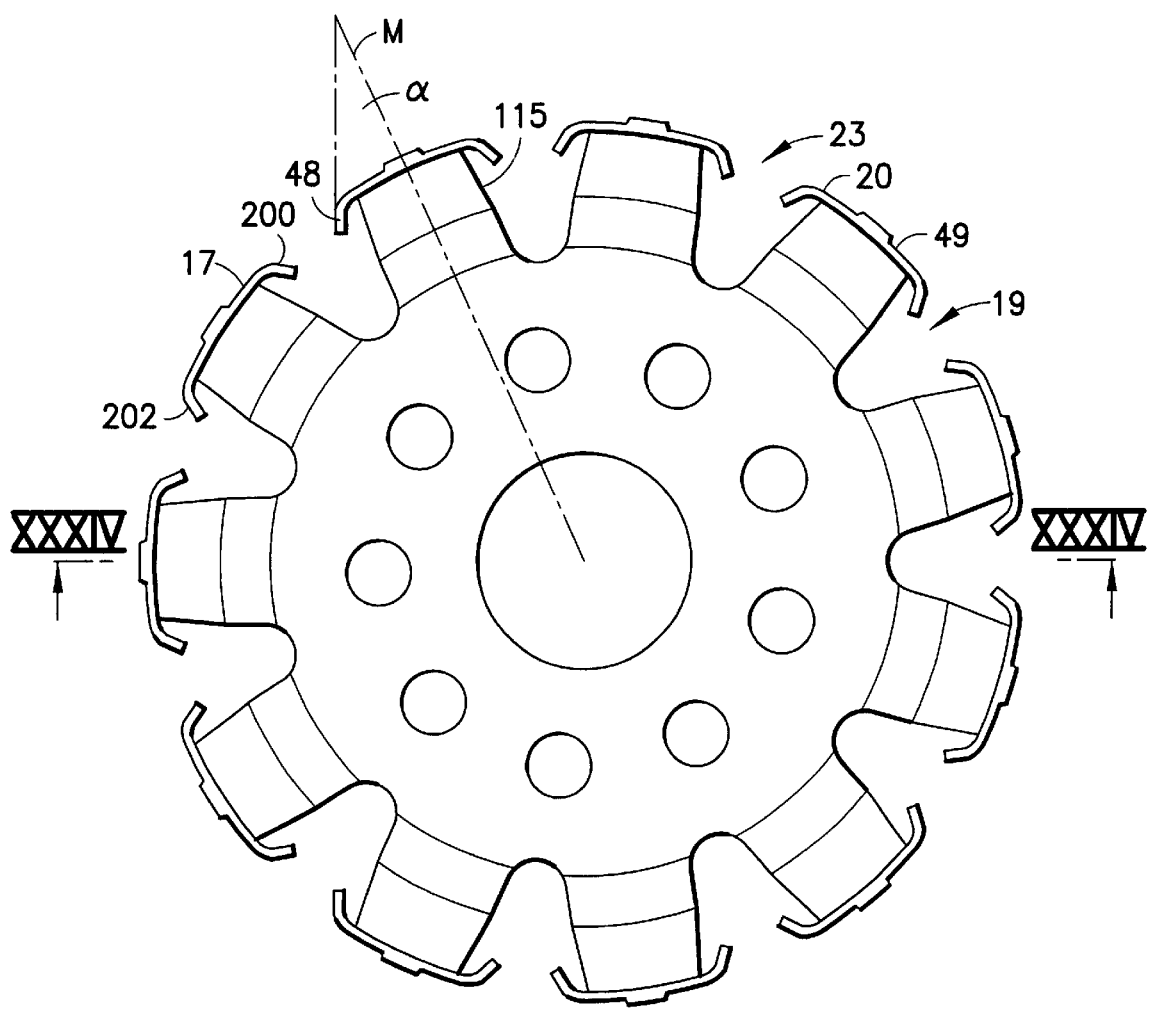
FIG. 33 shows an axial view of the tooth system component in FIG. 32.
Figure 34:
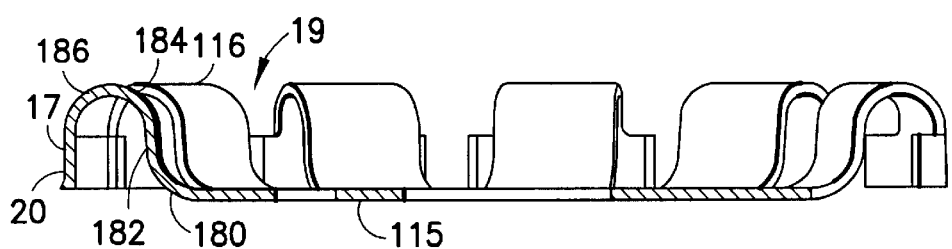
FIG. 34 shows a section view of the tooth system component shown in FIG. 33, along the line XXXIV—XXXIV.
Figure 35:
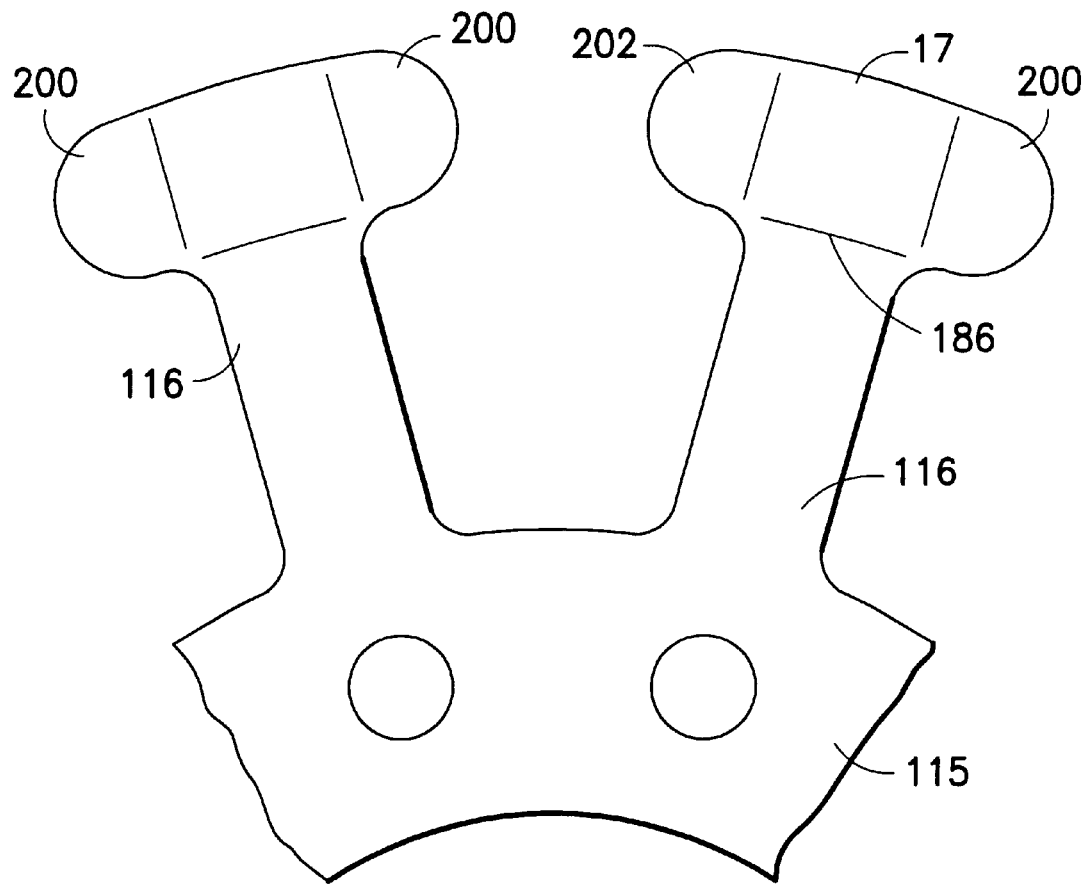
FIG. 35 shows a partial axial view of a blank for a tooth system component as shown in FIGS. 32 to 34.
Figure 36:
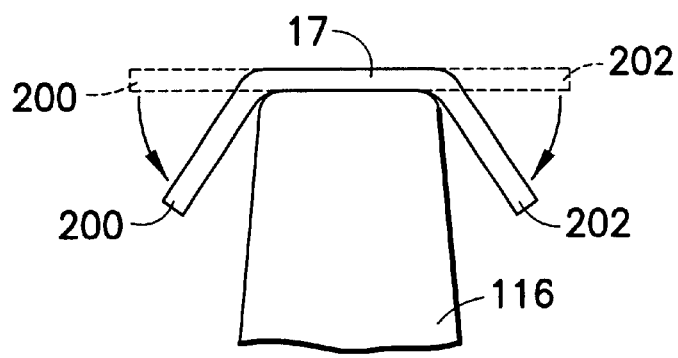
FIG. 36 shows the forming process to produce a tooth for the tooth system component shown in FIGS. 32 to 34.

FIGS. 32 to 38 show a further embodiment of a tooth system component according to the invention, which in this case is designed, for example, once again as a driver 23. This tooth system component or this driver 23 also has a central body region 115, from which a plurality of tongue-like projections 116 project radially outward. As can be seen in particular in FIG. 34, these radial or tongue-like projections 116, starting from the body region 115, initially merge into the first bend region 180, then into a first region 182 which extends essentially, that is to say approximately, axially, then into the second bend region 184, the third bend region 186 as well as the axial attachment 17. The outer surface of each axial attachment 17, that is to say its surface 49 which points radially outward, in this case forms an end surface of a respective tooth 20 of the tooth system 19. Circumferential projections 200, 202 project in both circumferential directions from each axial attachment 17 and, as can be seen in FIGS. 32 to 34, are bent radially inward and thus form the flank surfaces 48, which merge into the end surface 49 of each tooth 20. Securing projections 120 are once again formed on the free end region 98 of each axial attachment 17 and, as already described above, interact with the ring elements 110, 112 of the installation apparatus 70 in order to fix them on the driver 23 (see FIGS. 37 and 38). The bend in this case has a shape such that, with regard to the radially outward extension of the flank surfaces 48, these extension lines form an acute angle α in the range from 10° to 50°, preferably 20° to 30°, with a longitudinal center plane M which is at right angles to the plane of the drawing in the illustration in FIG. 33 and contains a radial line. This has the advantages discussed above in terms of compensating for manufacturing inaccuracies.

The provision of the flank surfaces 48 by means of bent circumferential projections 200, 202 leads to circumferential elasticity being provided for the engagement of the tooth systems 19 and 51, which elasticity results from the elastic link between the circumferential projections 200, 202 at each axial attachment 17. This elasticity also makes it possible to compensate for manufacturing tolerances. The provision of the bent circumferential projections 200, 202 furthermore has the advantage that the individual teeth 20 are very stiff in the axial direction due to the plastic deformation that occurs when these circumferential projections 200, 202 are being bent. Furthermore, the bend has the advantage that no regions of the teeth project radially outward beyond the axial attachment 17, so that the tooth system radius can be made smaller for the same configuration, that is to say length, of the radial projections 116.

It should be mentioned that such a configuration of the teeth 20 is also possible if the body region 115 extends radially outward into the third bend region 186, that is to say essentially only the axial attachments 17 are bent from the body region 15.

Figure 37:
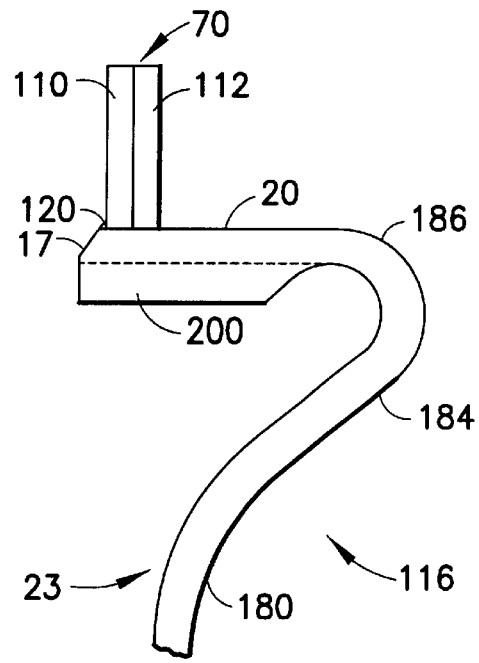
FIG. 37 shows a side view of a tongue-like projection which is fitted with a tooth, in conjunction with an installation apparatus.
Figure 38:
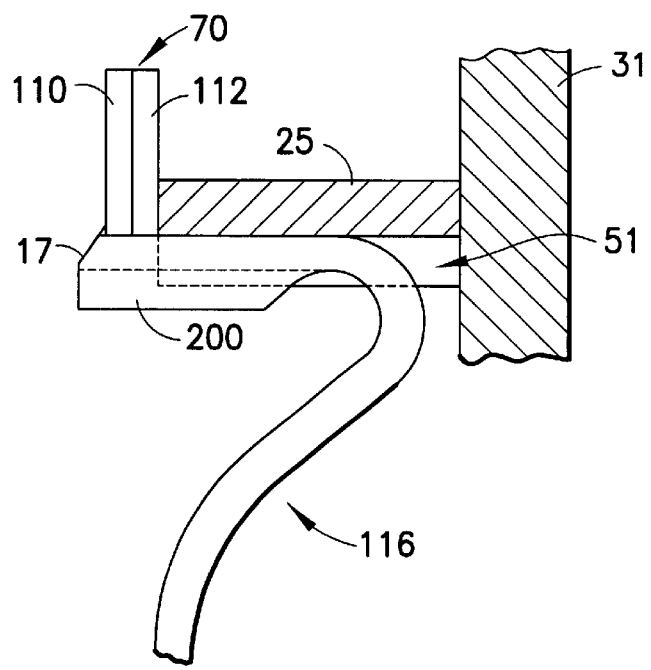
FIG. 38 shows the tooth from FIG. 37 engaged with a mating tooth system.
Figure 39:
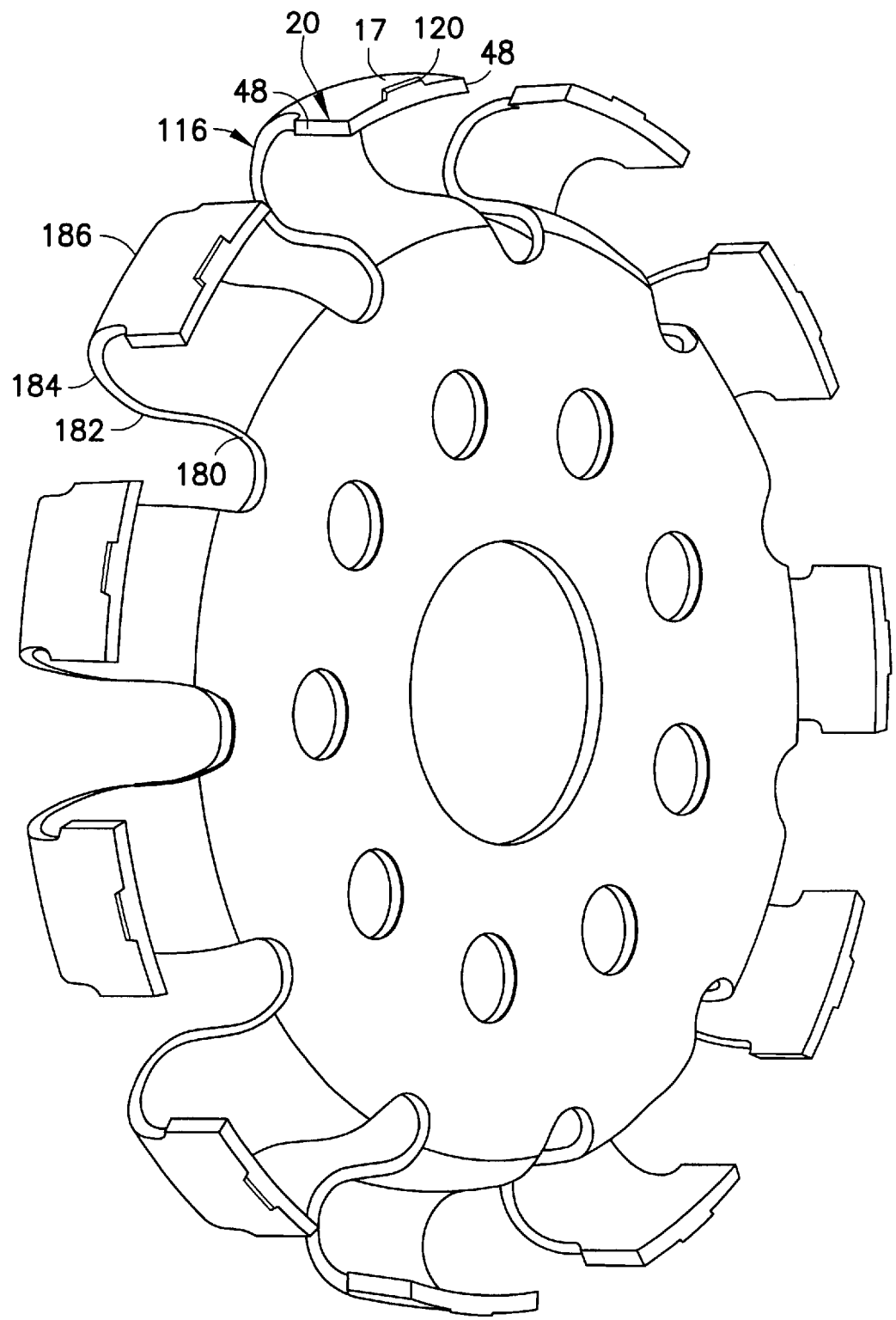
FIG. 39 shows a perspective view of a further embodiment of a tooth system component.
Figure 40:
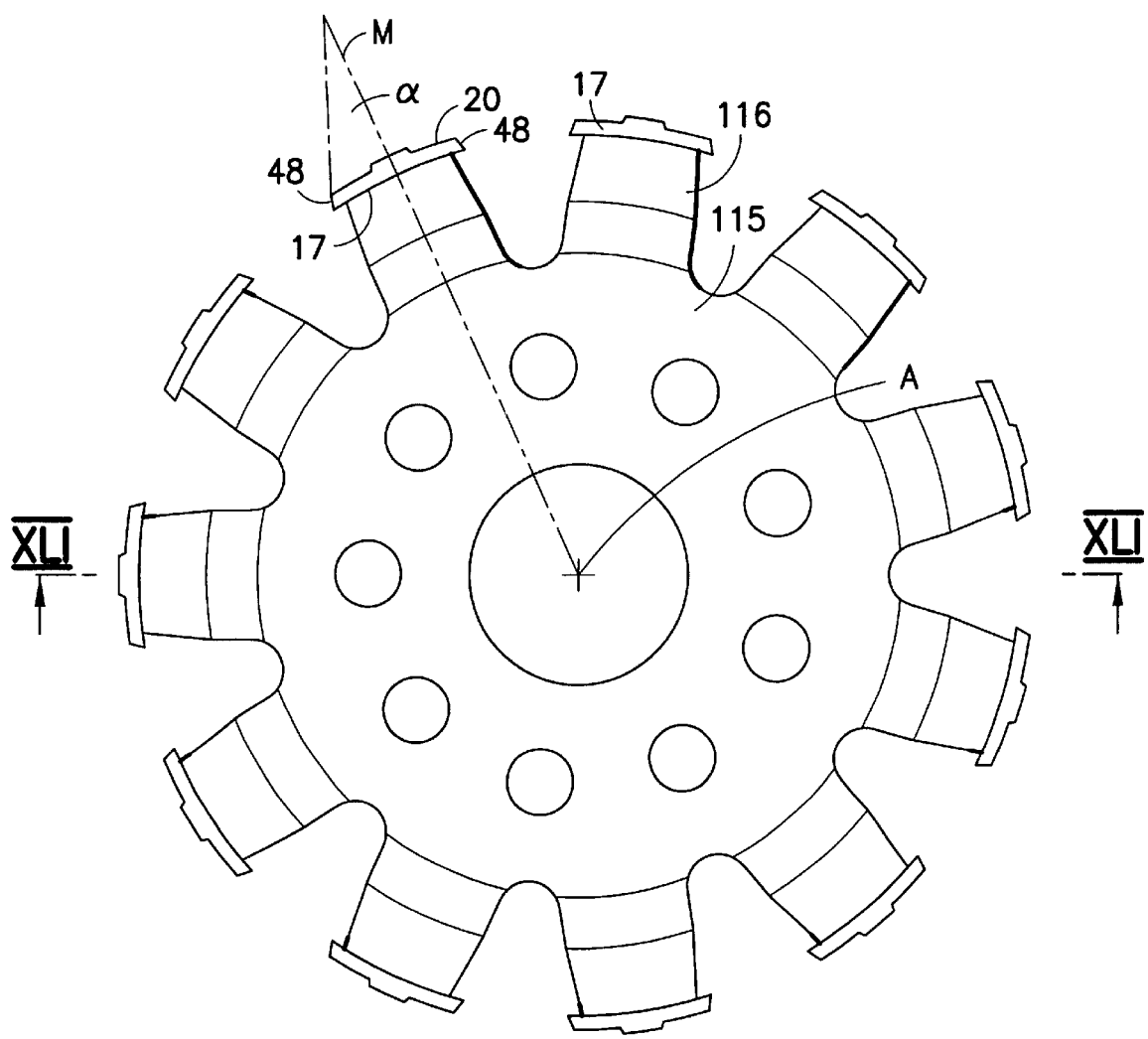
FIG. 40 shows an axial view of the tooth system component shown in FIG. 39.
Figure 41:
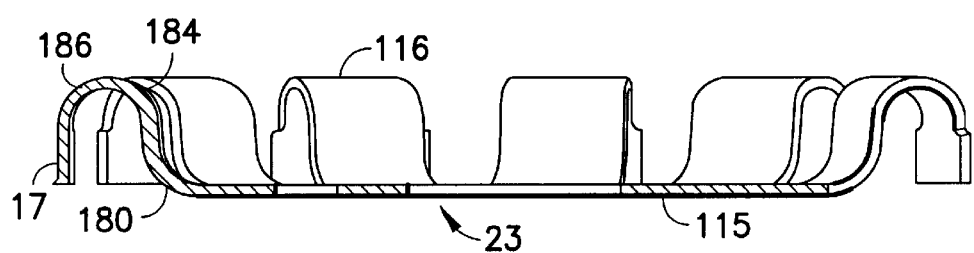
FIG. 41 shows a section view of the tooth system component shown in FIG. 40, along the line XLI—XLI in FIG. 40.

As can be seen in FIG. 37, the axial attachments 17 are preferably furthermore designed in such a manner that, when no force is being applied to them, they extend slightly radially outward away from the third bend region 186. In the illustration shown in FIG. 37, the two ring elements 110, 112 can then be pushed on from the right until they abut against the securing projections 120 of the teeth 20, in which case, during this process of pushing them on, the teeth 20 are already pushed or prestressed slightly radially inward. The spreading effect of the teeth 20 then results in the ring elements 110, 112 being held on the tooth system component 23 by static friction. After this, they are pushed axially together with the ring elements 110, 112 into the tooth system 51 of the holder 25, with, if necessary, the ring elements 110, 112 having previously been rotated, as has been described above with reference to FIGS. 14 to 25. It should also be mentioned that, as described above with reference to FIG. 28, the individual axial attachments 17 may be designed in such a manner that they are not matched to a circumferential line or circular line, but extend essentially tangentially with respect to a radial line when viewed in the circumferential direction, so that, once again, this results in the elasticity advantages discussed above. It should furthermore be mentioned that, after the forming or processing operations have been carried out, the spring steel component can be hardened. This also applies to the embodiment which is still to be described in the following text and which is illustrated in FIGS. 39 to 43.

In this embodiment, which corresponds essentially to the embodiment shown in FIGS. 29 to 31, the axial attachments 17 intrinsically once again form the teeth 20. This means that side surface regions in each case located in the circumferential direction form the flank surfaces 48, so that each tooth has an extent in the radial direction which corresponds to the material thickness of the projections 116 in the radially outer region, in particular in the region of the axial attachments 17. It can be seen that, in the region of the axial attachments 17, the individual projections 116 are broadened in the circumferential direction with respect to the immediately adjacent third bend region 186, so that the tooth width is greater here. This allows matching to a wide range of different tooth types. If there is a continuous transition between the third bend region 186 and the axial attachment 17, this results in the advantage described above with respect to FIGS. 29 to 31, that the axial length of each tooth may be greater, since the side surface region of the third bend region 186 may also contribute to some extent to the flank area.

Figure 42:
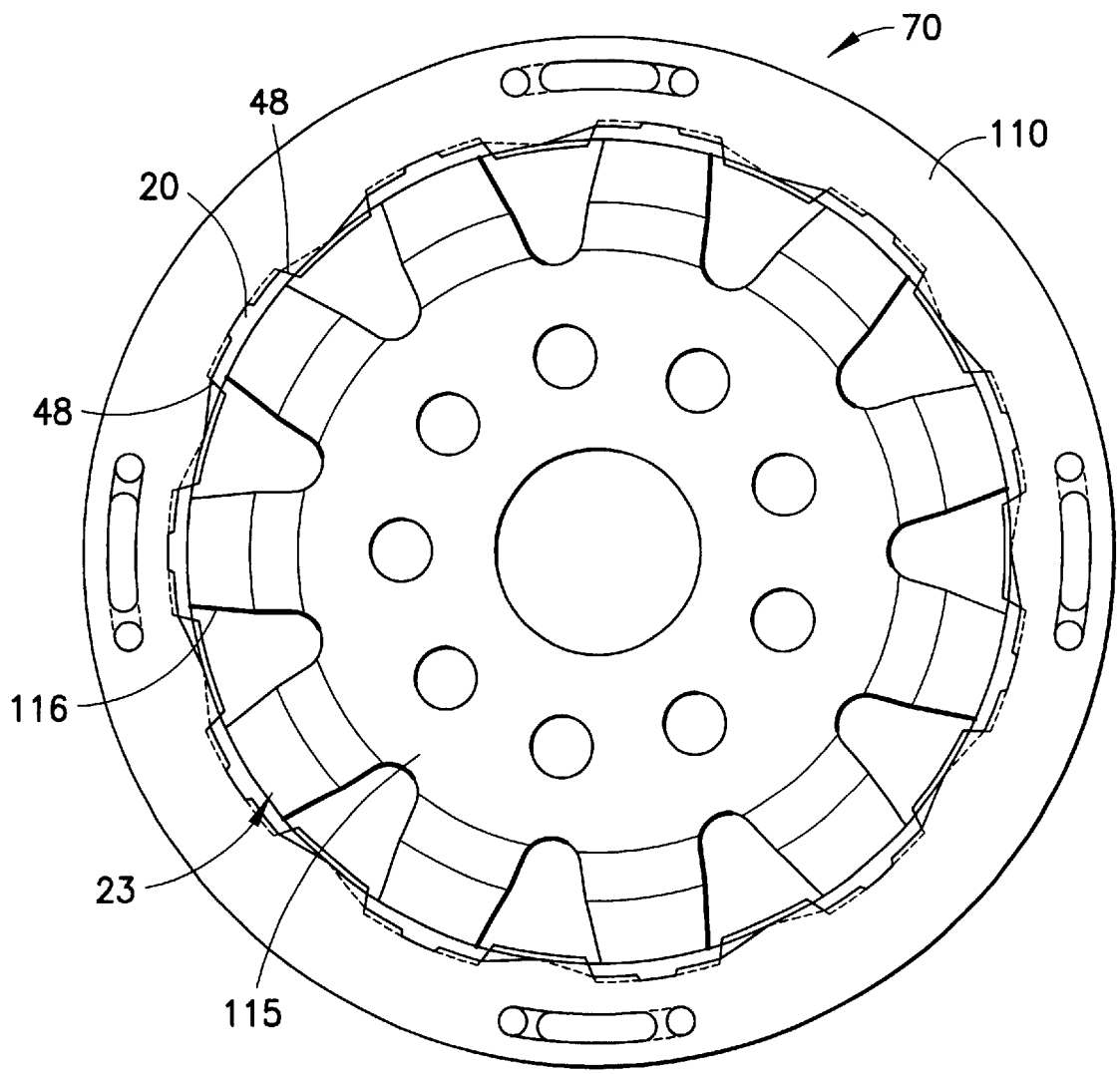
FIG. 42 shows the tooth system component illustrated in FIGS. 39 to 41, in conjunction with an installation apparatus, as is illustrated in FIGS. 14 to 25.
Figure 43:
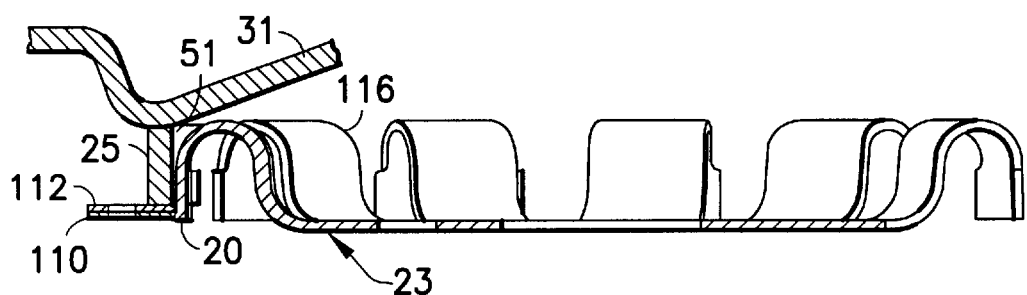
FIG. 43 shows a partial section view of the tooth system component illustrated in FIG. 42.

In this embodiment as well, the flank surfaces 48 are once again inclined at the angle a in the range from 10° to 50° with respect to the longitudinal center plane of each tooth 20. This inclination may be produced, for example, by reworking after the stamping of the component blank, by using a broaching tool or the like. Otherwise, the embodiment shown in FIGS. 39 to 43 corresponds in terms of the rest of the construction and with respect to its function to the embodiments described above. In particular, as is shown in FIGS. 42 and 43, this embodiment can also be used in conjunction with the installation apparatus 70, which uses the two ring elements 110, 112.

It should be mentioned that, in the case of the embodiments described above and in which a tooth system component may form either a driver or a holder and is produced by forming a spring steel blank or some other sheet metal blank, the individual teeth can be formed (depending on the configuration of these teeth) before or after the forming of a stamped or cut material blank. For example, if the teeth are formed by stamping or by bending circumferential projections, it is advantageous for this process to be carried out before the individual axial attachments and/or radial projections are bent to shape. If the individual teeth are formed by the axial attachments themselves, that is to say the flank surfaces are in the region of the material or wall thickness, it is advantageous to bend the individual axial attachments first of all, and then to form the oblique flank surfaces using a broaching tool or the like. When this process is being carried out, the individual axial attachments 17, which preferably run slightly radially outward away from the third bend region with respect to the axis of rotation, can then, for example, initially be moved to a position parallel to the axis, which in the end corresponds to the position which the axial attachments 17, and thus the teeth 19 fitted to them, assume once the coupled state has been produced. This means that the oblique surfaces produced by broaching have exactly the shape which they need to have. For example, once the axial attachments have been formed by bending or the like, the individual tooth system components can for this purpose be clamped in a tool and the teeth can be aligned parallel to the axis by means of a tool, during which process a plurality of tooth system components can in this case be positioned with aligned axial attachments following one another in the direction of the axis, so that a plurality of flank surfaces can be produced on different tooth system components at the same time using a broaching tool, in one movement in the axial direction.

Furthermore, it is advantageous in all the illustrated embodiments to carry out a hardening process after carrying out the individual forming processes so that, in particular, it is possible to avoid the occurrence of wear in those tooth system surface regions of the various tooth systems which are in contact with one another.

As a result of the use of a body which can be stamped and bent from spring steel in order to form the tooth system components, it is possible to achieve the wide range of aspects described above with regard to the provision of specific robustness and spring elasticity in a simple manner in that, during the stamping process, for example, the individual radial projections are formed with a tapering profile, the slots are incorporated, the transitional radii between the individual radial projections are produced in a suitable manner and in that, after this and during the forming process, the various bend regions and the regions which there may be between these but which are essentially not bent are provided and, if appropriate, care is taken during the forming process to ensure that the individual axial attachments are not curved in the circumferential direction. It should be mentioned that, however, if the preconditions are different, it may also be desirable for the individual axial attachments 17 to be curved in the circumferential direction in order to provide adequate stiffness, that is to say, when viewed in the circumferential direction, for them to have a contour which is approximately that of a circular shape or the like.

It should be mentioned that, where the text above refers to specific directions, that is to say, for example, axially or radially or approximately axially and/or radially or essentially axially or radially, this means that this indicates a substantial component of the extent of the respective parts. It thus does not mean that an exact extent in the axial or radial direction must be present in each case, but that this is only an indicative direction from which specific discrepancies, for example in the stated angular range may occur, or may even be desirable.

The invention is not limited by the embodiments described above which are presented as examples only but can be modified in various ways within the scope of protection defined by the appended patent claims.

I claim:

1. An installation apparatus for a coupling device having a drive, a driver that acts on the drive, a flywheel mass which faces the drive and is operatively connected to the driver so that the flywheel mass and the driver rotate together, and a holder provided on the flywheel mass so as to face the driver, the holder being provided with a tooth system, the driver having an axial attachment which is likewise provided with a tooth system on a side facing the holder, the tooth system of the driver having at least one tooth that engages in a tooth gap between each two teeth of the tooth system of the holder so that teeth of at least one of the two tooth systems are positioned opposite a respective other of the two tooth systems with radial prestressing, the installation apparatus being useable to make or break an engagement between the tooth systems in which case the tooth systems engage at least radially in one another and the tooth system located radially on the inside is prestressed radially outward against the tooth system located radially on the outside, the component which has the tooth system located radially on the inside can be elastically deformed radially at least in a region of its tooth system, the installation apparatus comprising: two ring elements which are fittable so that they can rotate on the component which has the tooth system located radially on the inside, the ring elements having a deformation formation by means of which, when the ring elements rotate about an axis of rotation, radial positioning of the component, which has the tooth system located radially on the inside, can be varied in a region of the tooth system located radially on the inside, the two ring elements having deformation inclines which in each case run in opposite directions to one another, one of each tooth and each group of teeth of the tooth system located radially on the inside being assigned a pair formed from a deformation incline of each ring element.

2. An installation apparatus as defined in claim 1, wherein the two ring elements can rotate in mutually opposite directions about the axis of rotation in order to make or to break a coupling engagement between the tooth systems.

3. An installation apparatus as defined in claim 1, wherein the two ring elements are prestressed with respect to one another in order to rotate in the circumferential direction, to a relative rotation position in which a coupling engagement between the tooth systems is made, H-shaped leaf spring elements being provided in mutually associated recesses of the two ring elements so as to prestress the ring elements.

4. An installation apparatus as defined in claim 1, wherein the ring elements each have at least one tool attachment formation for a tool to act on, by means of which tool the ring elements can be rotated about the axis of rotation, the tool having two substantially parallel sections that are movable toward one another and are engagable with the attachment formations.

* * * * *